(12) United States Patent
Niedzwiecki

(10) Patent No.: US 8,950,530 B2
(45) Date of Patent: Feb. 10, 2015

(54) STACKABLE DISASTER RELIEF VEHICLE

(76) Inventor: Alan Niedzwiecki, Newport Beach, CA (US)

( * ) Notice: Subject to any disclaimer, the term of this patent is extended or adjusted under 35 U.S.C. 154(b) by 57 days.

(21) Appl. No.: 13/582,097

(22) PCT Filed: Feb. 18, 2011

(86) PCT No.: PCT/US2011/000298
§ 371 (c)(1),
(2), (4) Date: Oct. 25, 2012

(87) PCT Pub. No.: WO2011/112233
PCT Pub. Date: Sep. 15, 2011

(65) Prior Publication Data
US 2013/0153314 A1    Jun. 20, 2013

Related U.S. Application Data

(60) Provisional application No. 61/309,382, filed on Mar. 1, 2010.

(51) Int. Cl.
*B60P 3/24* (2006.01)
*B60P 3/00* (2006.01)
*B62D 21/08* (2006.01)
*B62D 33/02* (2006.01)
*B62D 33/06* (2006.01)
*B62D 47/00* (2006.01)
*B60K 6/46* (2007.10)

(52) U.S. Cl.
CPC . *B60P 3/00* (2013.01); *B62D 21/08* (2013.01); *B62D 33/02* (2013.01); *B62D 33/0625* (2013.01); *B62D 47/006* (2013.01); *B60K 6/46* (2013.01)
USPC .... 180/65.31; 280/831; 280/838; 280/33.998

(58) Field of Classification Search
USPC .................. 280/838, 831, 33.998
See application file for complete search history.

(56) References Cited

U.S. PATENT DOCUMENTS

| | | | | |
|---|---|---|---|---|
| 2,474,094 A | * | 6/1949 | Colquitt | 280/831 |
| D159,108 S | * | 6/1950 | Stevens | D12/95 |
| 2,923,268 A | * | 2/1960 | Fletcher et al. | 440/12.66 |
| 4,611,962 A | * | 9/1986 | Braly et al. | 410/57 |
| 4,796,914 A | * | 1/1989 | Raynor | 280/757 |

(Continued)

FOREIGN PATENT DOCUMENTS

| | | |
|---|---|---|
| JP | 2011-227472 | 8/1999 |
| JP | 2008-125423 | 6/2008 |

(Continued)

OTHER PUBLICATIONS

International Search Report dated Nov. 18, 2011, issued in PCT/US2011/000310.

*Primary Examiner* — Jeffrey J Restifo

(57) ABSTRACT

A stackable mobile platform vehicle with a body with attached tires and wheels with a load bearing strength of at least 2500 pounds. In some instances the platform vehicle is powered by an electrical motor coupled to a generator which is powered by an internal combustion engine. A large flat load bearing deck on top of the vehicle is sufficient to support the weight of at least one additional stackable mobile platform vehicle. In some instances electricity produced by the generator can by exported from the mobile vehicle platform for use external to the mobile vehicle platform.

6 Claims, 28 Drawing Sheets

(56) References Cited

U.S. PATENT DOCUMENTS

| | | | |
|---|---|---|---|
| 4,971,356 A * | 11/1990 | Cook | 280/759 |
| 4,992,013 A | 2/1991 | Westerdale | |
| 5,370,418 A * | 12/1994 | Pugh | 280/830 |
| 5,476,146 A * | 12/1995 | Brown | 169/24 |
| 5,573,300 A * | 11/1996 | Simmons | 296/193.04 |
| 5,658,013 A * | 8/1997 | Bees et al. | 280/831 |
| 5,934,695 A * | 8/1999 | Rowland | 280/33.998 |
| 6,029,750 A * | 2/2000 | Carrier | 169/52 |
| 6,241,438 B1 * | 6/2001 | Corbett et al. | 410/56 |
| 6,283,527 B1 * | 9/2001 | Desmarais | 296/39.2 |
| 6,340,177 B1 * | 1/2002 | Granderson et al. | 280/833 |
| 6,386,807 B1 * | 5/2002 | Rowland | 410/57 |
| 6,598,242 B1 * | 7/2003 | Denome | 4/321 |
| 6,641,206 B1 | 11/2003 | Bergstrom et al. | |
| 6,723,173 B1 * | 4/2004 | Golladay | 134/21 |
| 6,726,438 B2 * | 4/2004 | Chernoff et al. | 414/802 |
| 7,159,902 B2 * | 1/2007 | Carty | 280/759 |
| 7,192,060 B2 * | 3/2007 | Warrick | 280/831 |
| 7,303,033 B2 * | 12/2007 | Chernoff et al. | 180/65.8 |
| 7,674,087 B2 * | 3/2010 | He et al. | 414/802 |
| 7,681,892 B1 * | 3/2010 | Crews et al. | 280/33.997 |
| 7,992,648 B2 * | 8/2011 | Groonwald | 169/52 |
| 2007/0237616 A1 | 10/2007 | Maxwell | |
| 2009/0278326 A1 * | 11/2009 | Rowland et al. | 280/33.998 |
| 2009/0279976 A1 | 11/2009 | Sain et al. | |
| 2012/0139199 A1 * | 6/2012 | Burns | 280/33.998 |
| 2013/0153314 A1 * | 6/2013 | Niedzwiecki | 180/65.245 |

FOREIGN PATENT DOCUMENTS

| | | |
|---|---|---|
| KR | 10-2006-0034265 | 4/2006 |
| KR | 20-2009-0010134 | 10/2009 |

* cited by examiner

STACKABLE DISASTER RELIEF VEHICLE

RELATED APPLICATION

This application claims the full Paris Convention benefit of and priority to U.S. Provisional Patent Application Ser. No. 61/309,382, filed Mar. 1, 2010 the contents of which are incorporated by reference herein in their entirety, as if fully set forth herein.

BACKGROUND

This disclosure relates to a stackable mobile platform vehicle.

SUMMARY

During disasters and emergencies, in particular, normal protocols for the operation of society and infrastructure of a community may become challenged, taxed or broken, recent events in New Orleans following hurricane Katrina and the devastating earthquakes in Chile and in Haiti during 2010 are but a few examples.

Time is of the essence in providing relief and establishing a workable infrastructure for delivering said relief. A stackable disaster/relief vehicle platform comprises a minimal footprint for storage and shipping and is therefore well suited for storage, shipment and delivery to the scene of an emergency or disaster.

Providing water and electrical power in a relief situation is important for bringing calm to a situation and saving lives. The DRV platform's electrical power generator which can power the DRV with motive force for operation and use as a vehicle is switchable to export power off the DRV platform to power areas in need of assistance. The mobile platform in some implementations provides at least one of water, power and light

DRAWINGS

The above-mentioned features and objects of the present disclosure will become more apparent with reference to the following description taken in conjunction with the accompanying drawings wherein like reference numerals denote like elements and in which:

FIGS. 8A through 8D show a stackable mobile platform with water module and auxiliary bed.

Figure 1A:
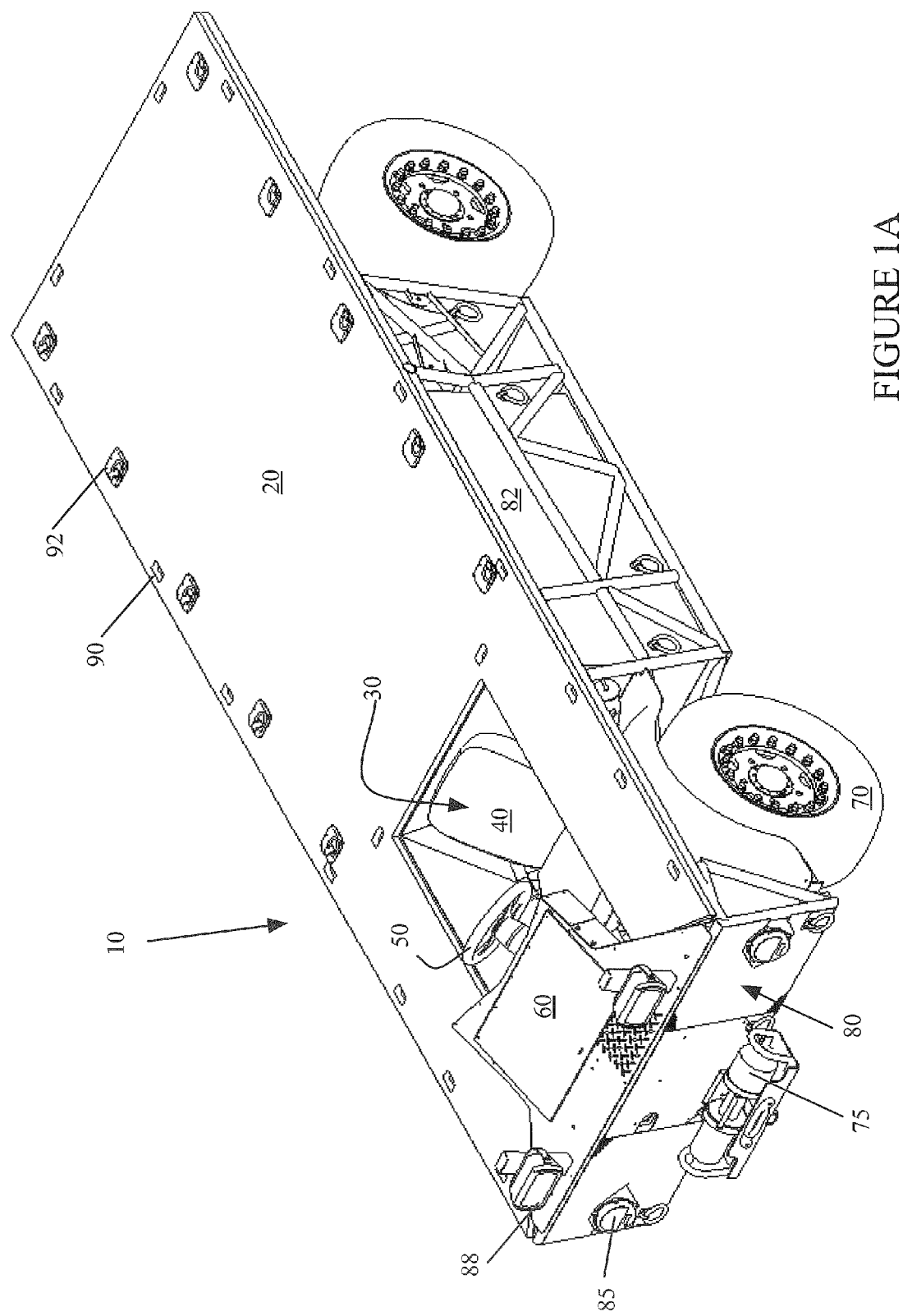
FIGS. 1A and 1B show a stackable disaster relief vehicle "DRV" platform and electrical supply system.

It should be appreciated that for simplicity and clarity of illustration, elements shown in the Figures have not necessarily been drawn to scale. For example, the dimensions of some of the elements are exaggerated relative to each other for clarity. Further, where considered appropriate, reference numerals have been repeated among the Figures to indicate corresponding elements.

DESCRIPTIONS

A DRV or disaster relief vehicle is a mobile platform which is uniquely adapted and adaptable for meeting emergency needs and delivering relief in situations wherein the relief providers do not have all the data points on the situation or the status of the geography, weather and population are in flux. Disclosed herein are exemplary, implementations of mobile platforms to provide at least one of relief supplies, assistance, infrastructure, communications, command, medical, electrical power generation visa vie said DRV electrical power system for output to be used for non-motive power of at least between about between about 1 and 50 KWHs, water and food.

FIG. 1 shows an exemplary implementation of stackable mobile relief platform 10. A large flat lower deck 20 surrounds the command module 30. The command module has an operator's seat or bench 40, a control wheel 50, and instrument/communication cluster 60. Not shown are levers and/or pedals for necessary controls of acceleration, gear selection and braking. Moreover, those of ordinary skill in the art will recognize that a steering wheel may be replaced by a joystick, levers or other similar controls. Additional remote control adaptations are within the scope of this disclosure.

The vehicle has multiple tires 70 which receive power from one or more motive force producing items such as an internal combustion engine, an electric motor, or a combination of both to power said vehicle for operation on the ground and to travel from location to location.

A winch 75 is shown mounted or affixed to the body 80 of the DRV. Within the frame structure of the body 80 are one or more fuel tanks 82. The tubular farm structure is preferably implemented to have a load bearing capacity of at least about 3000 to 7000 lbs and a towing capacity of at least about 1000 to about 3000 lbs. The DRV is not constrained to meet DOT or highway safety regulations. The DRV lacks most safety features and comforts that are common place or required under highway regulations and it has high fuel capacity, high load and towing capacity. The DRV has disaster-centric functionality.

Also supported on the body of the DRV 80 are headlamps 85 and auxiliary front lighting 88. One or more catches 90 which accept posts like inserts are provided in the flat lower deck 20. One or more recessed tie down catches 92 are provided around the flat lower deck 20.

Figure 1B:
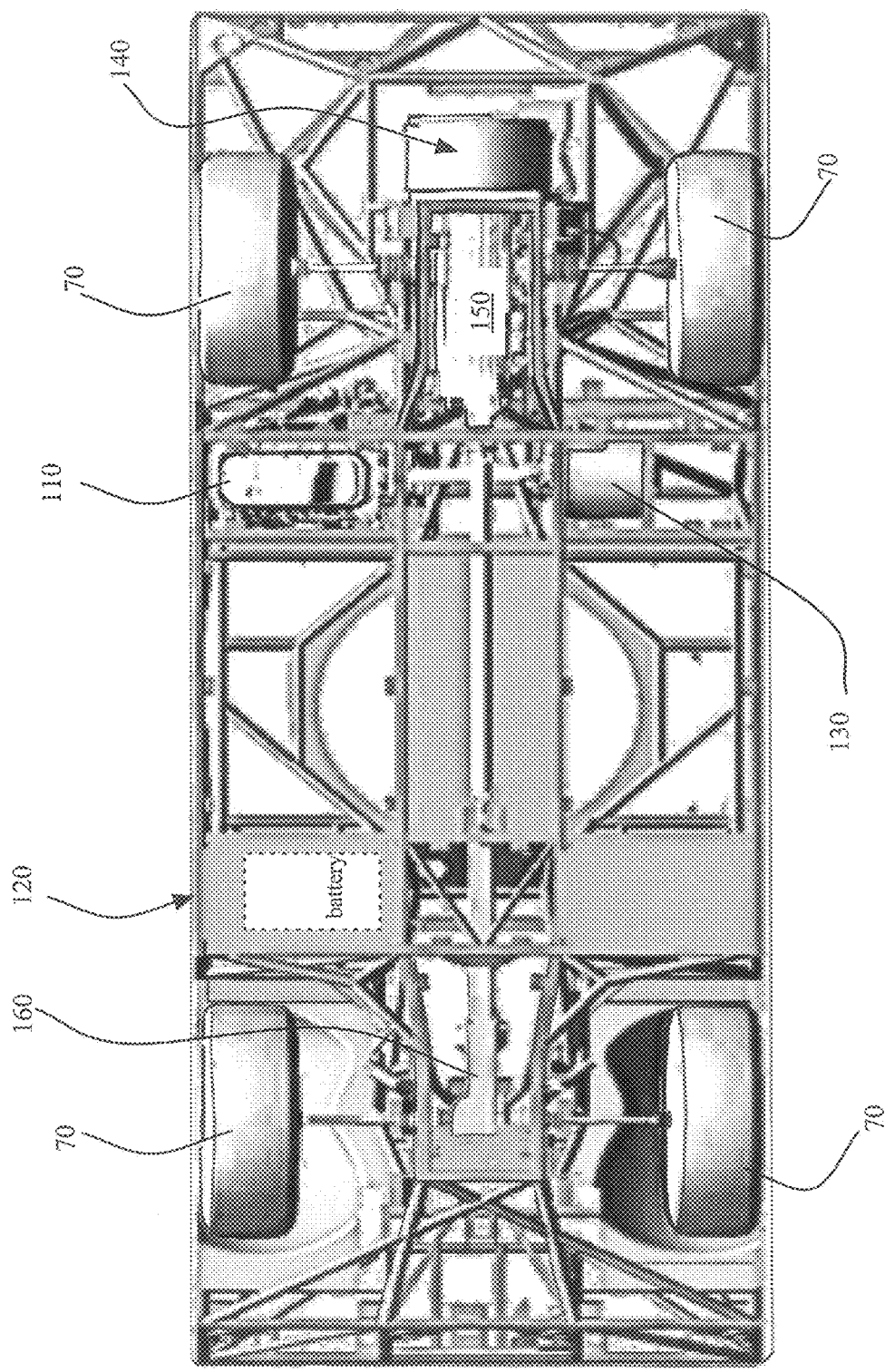

FIG. 1B shows a bottom view of a DRV and major drive train and power components are called out. Those of ordinary skill in the art will recognize that drive train and power components are routinely modified or swapped out for different capacity, geared or powered items depending on the intended use of a mobile vehicle, the fuel available or the intended area of usage, such shop modifications are all within the scope of this disclosure.

The DRV contains internal combustion engine 110 which may be gasoline or diesel. The size of the engine and output is a factor of the intended usage of the vehicle, FIG. 1B depicts an about 1 liter diesel engine which is not a limitation. Engine 110 is connected to an on board fuel supply (not shown) and electrical storage device (battery) 120. The electrical supply consists of one or more batteries. Engine 110 is coupled to electrical generator 130 which provides power to a motor 140 (such as a traction motor) which is coupled to transaxle 150 to supply motive force to at least some of wheels 70. A four wheel drive 4WD or all wheel drive "AWD" coupling 160 may be added to transfer power from the engine automatically or selectively to the front wheels 70.

Electrical power generated by generator 130 may be use by such things as at least one of electrical systems on the DRV, power for the DRV traction motor, equipment requiring power outside of the DRV and modules or equipment coupled with, on or to the DRV.

Those of ordinary skill in the art will also recognize that hybrid power system for the motive force of the vehicle may use a combination of an internal combustion engine and electrical motor to provide motive force in a parallel hybrid arrangement. It is also within the scope of the disclosure to provide motive force to the DRV via an internal combustion engine coupled to a drivetrain which and that internal combustion engine may also can be coupled to an electrical generator to provide electrical power for non-motive systems or electrical power to export off the DRV as needed.

Figure 2A:
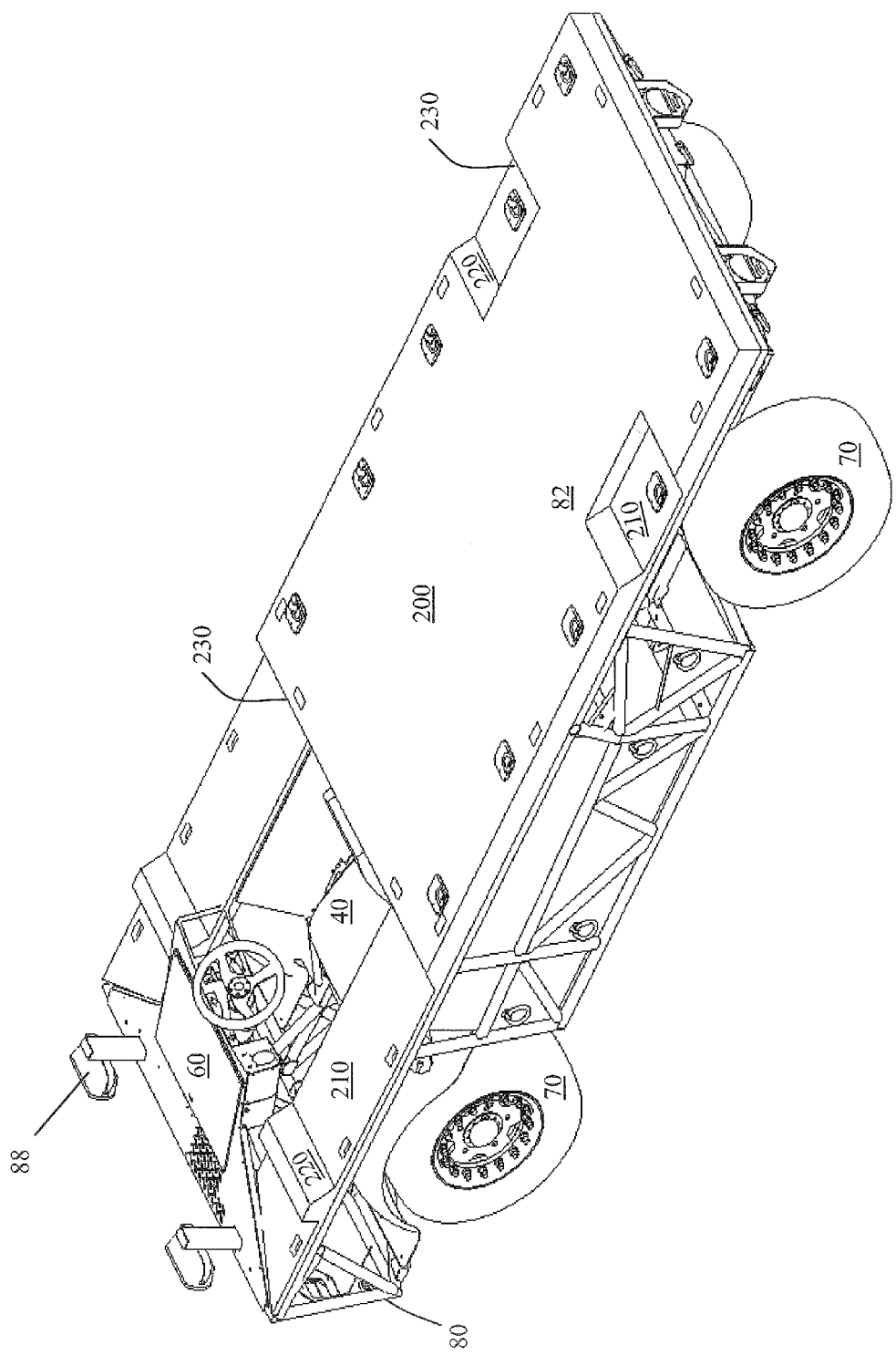
FIGS. 2A and 2B show a stackable disaster relief vehicle "DRV" platform.
Figure 2B:
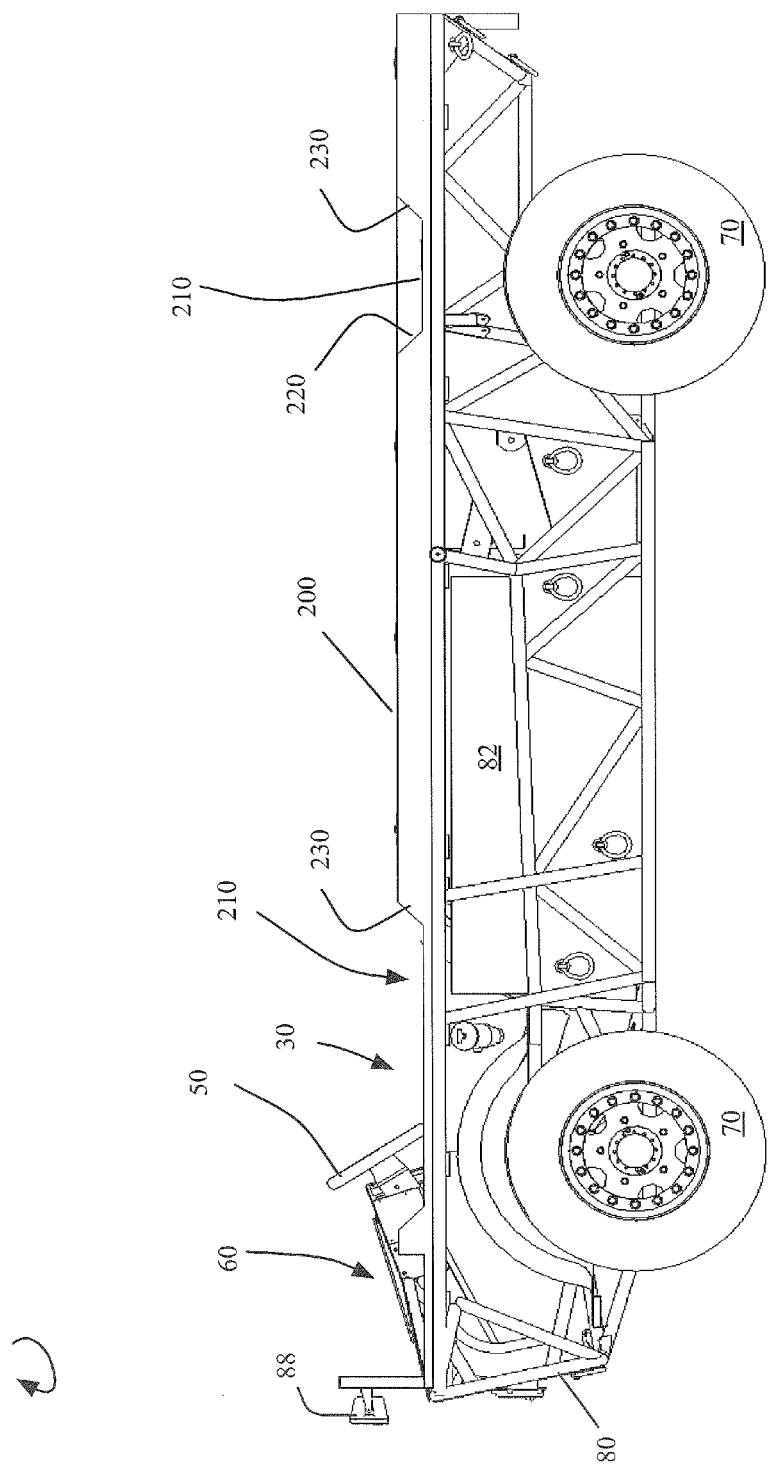

FIGS. 2A and 2B illustrate another DRV or disaster relief vehicle is a mobile platform in this implementation either as a replace for, or in lieu of, the flat lower deck 20 is tire receiving flat lower deck 200 in which guides 210 are formed to receive tires of another vehicle such as a DRV on top thereof. Guides 210 have front stops 220 and rear stops 230 to seat the tires of the stacked vehicle.

Figure 3:
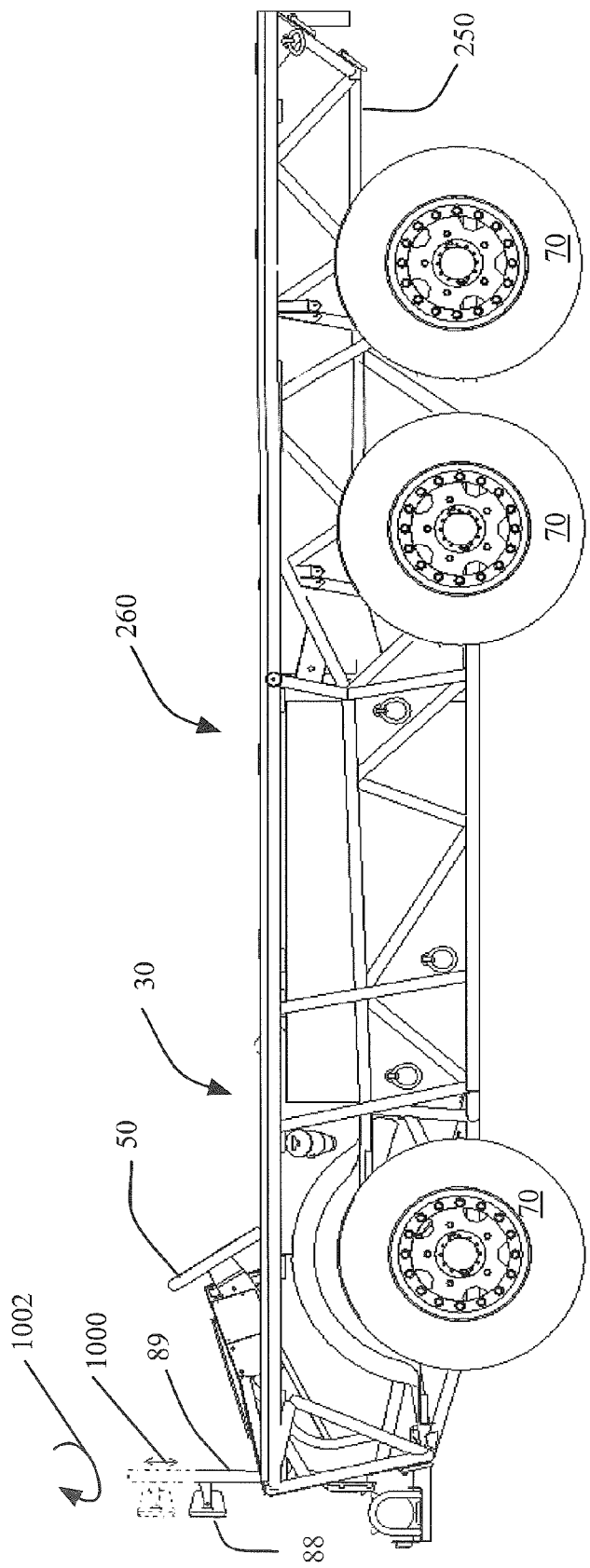
FIG. 3 shows a stackable disaster relief vehicle "DRV" platform.

FIG. 3 shows a six wheel DRV. The body 250 is supported on 3 axels and six tires 70. The additional tires increase the load carrying capacity of the DRV and the length of the flat lower deck 260. The additional axle may or may not be powered. Auxiliary front lights 88 on this DRV may be fixed or titled. Said lights are shown movable up down and around the support post 89 as indicated by arrows 1000 and 1002. Those of ordinary skill in the art will understand that additional axels and wheels may be added. Further, a tank-like tread system may also be used in those instances where the additional weight of said tank tread is not determinative.

Delivery of the Platform

The DRV platform is a platform that is stackable one DRV upon another to minimize the shipping and storage footprint of the DRV. A series of two staked DRV platforms preferably weigh less than about 4500 lbs. A series of three DRV platforms, stacked preferably weight less than about 6500 lbs. The height of each DRV is minimized to provide a strong mobile structure with both a large flat surface a low height. Low height supports storage and shipping of the stacked DRVs in various existing modalities such as aircrafts, trucks and ships.

Figure 4A:
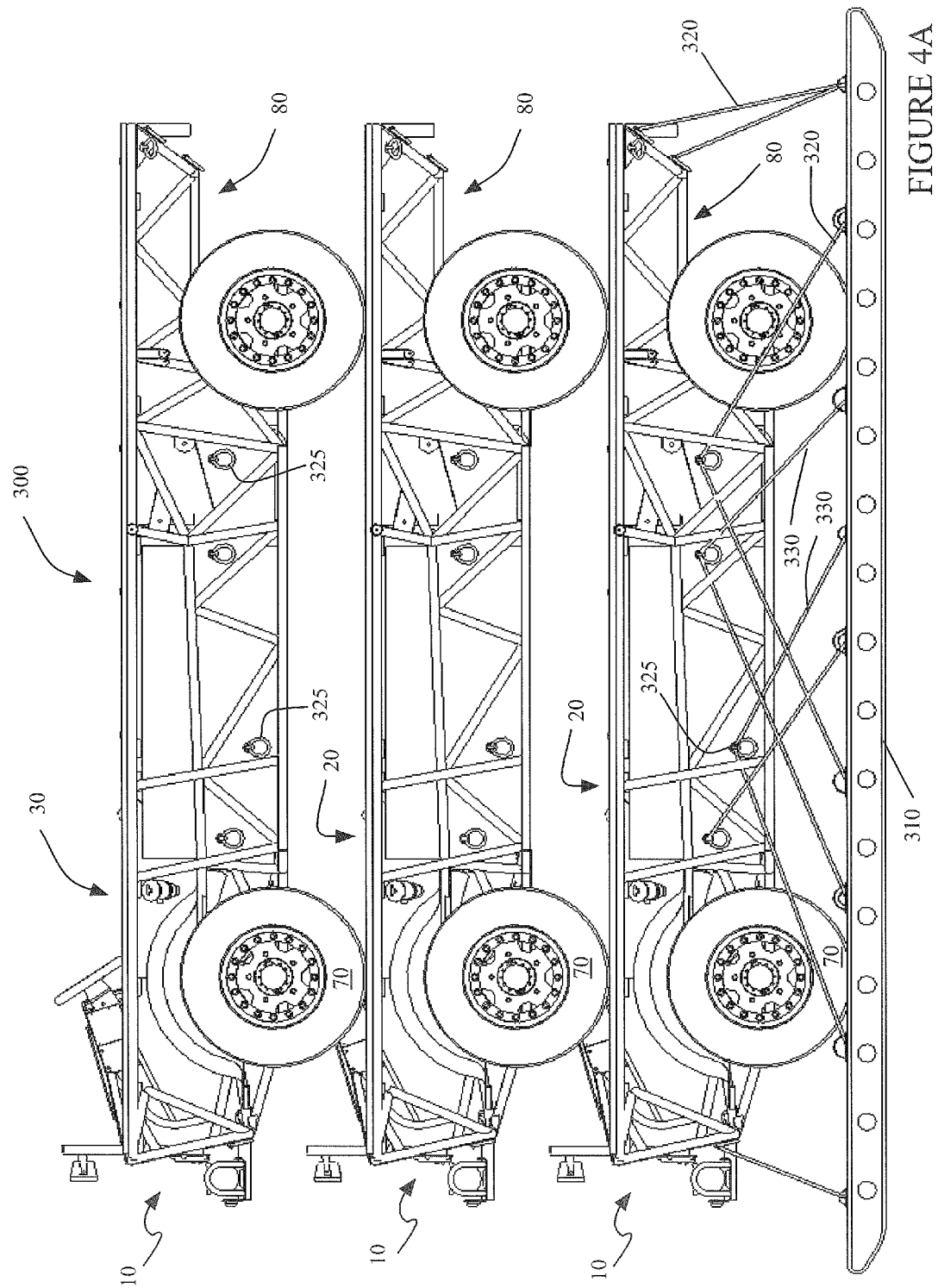
FIGS. 4A and 4B show a multistack of stackable disaster relief vehicle "DRV" platforms.
Figure 4B:
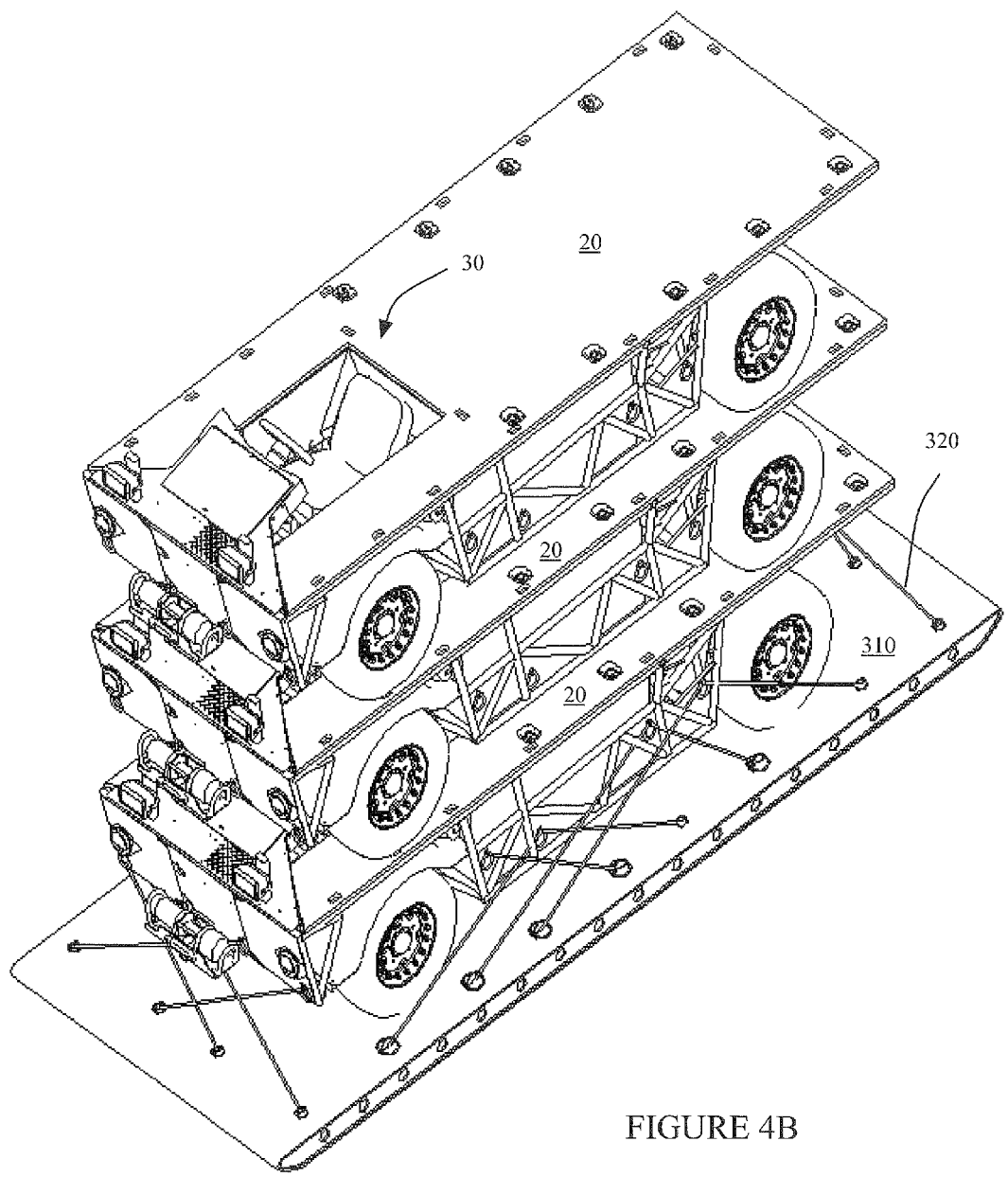

FIGS. 4A and 4B show an exemplary implementation of three stacked DRVs 300. DRVs 10 stack on top of each other. Stacking may be completed via ramps, or lifts. Three DRVS 10 are shown on transport pallet 310. The bottom DRV (nearest pallet 310) is shown lashed down with ties 320. The ties are connected to DRV body 80 via tie down guides 325 and ties downs 330. The tires 70 of the second and third DRV rest on flat lower deck 20 of the DRV below. The illustration of only the bottom DRV being tied down is not a limitation. In some instances the second and third DRV may be parked on the lower DRV(s) in other instances two or more DRVs may be tied down or connected together.

An important feature of the DRVs is that command module 30 is set low enough to allow stacking. In some instances the command module is centered between the wheels of the above DRV.

Figure 5A:
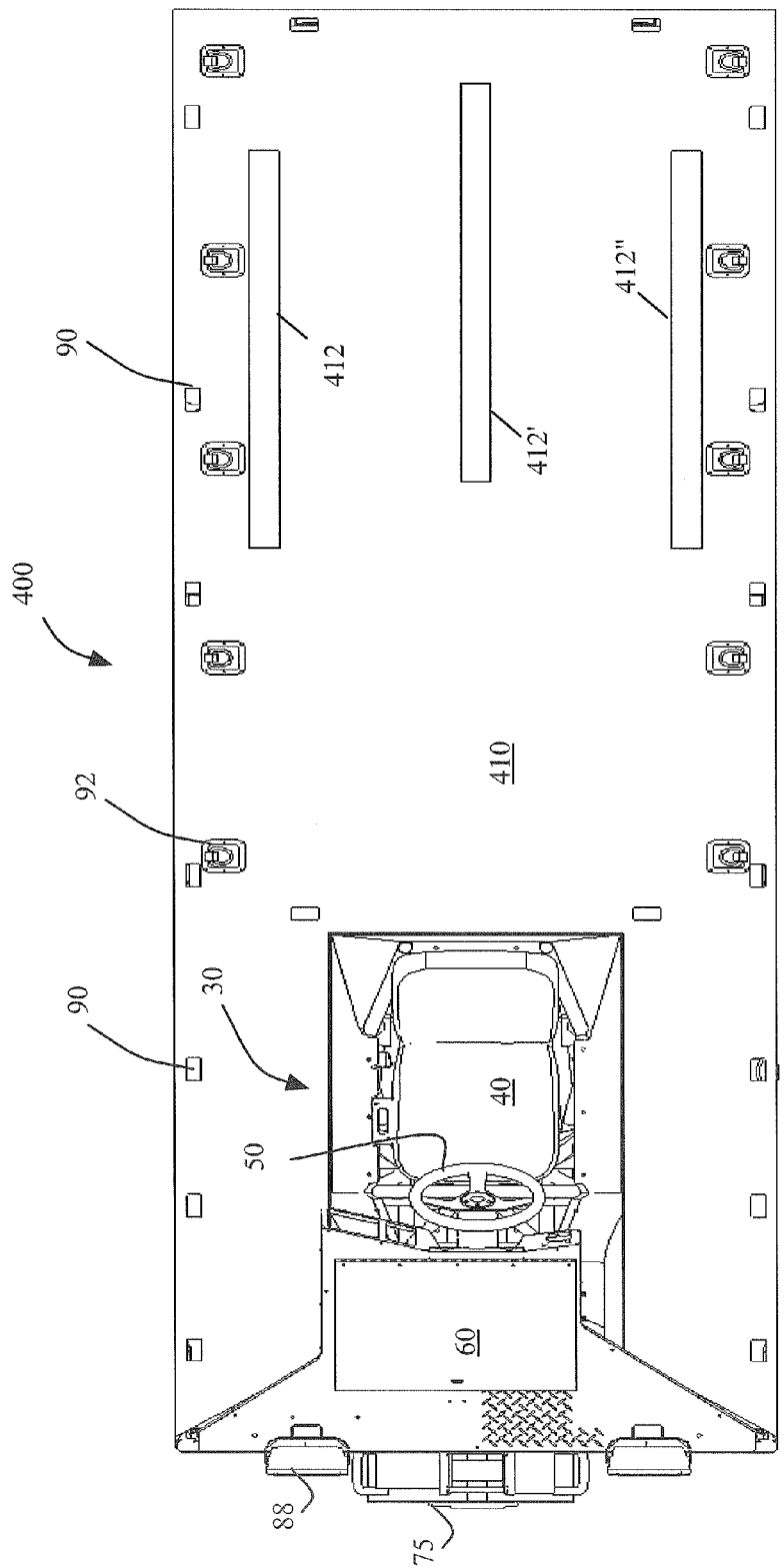
FIG. 5 shows a stackable mobile platform with rail.
Figure 5B:
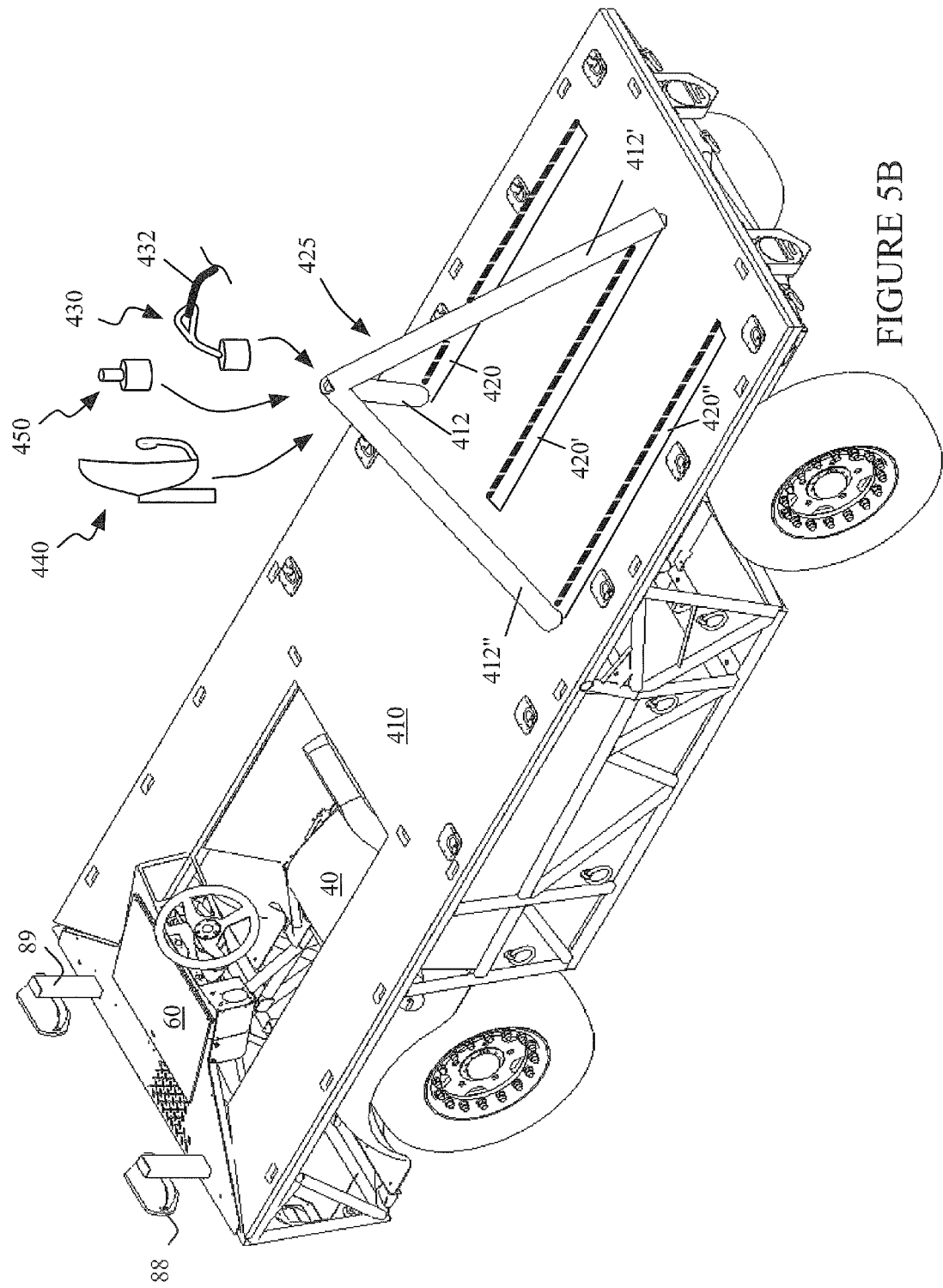

FIGS. 5A and 5B show an implementation wherein the lower deck 410 has collapsible tripod legs 412, 412' and 412". Tripod legs 412, 412' and 412" fold into leg guides 420, 420' and 420" for storage and to maintain the flat deck. Tripod legs 412, 412' and 412" raise and connect to form raised support 425 above the flat deck. Upon raised support 425 a variety of heads may be latched (latch not shown). Latchable items shown include pull mount 430 for a cable or line 432. Dish mount 440 which support a communications dish (which may include a parabolic listening dish, satellite, cell or other a/v system) and rotating mount 450 which is a sub mount upon which items that may require operator rotation such as water cannons, acoustic generating devices, and weapons may be placed.

Included within instrument/communications cluster 60 maybe a computer or docked (removable) computer, GPS navigation, satellite radio, cellular phone, video feed, and long range radio.

Figure 6A:
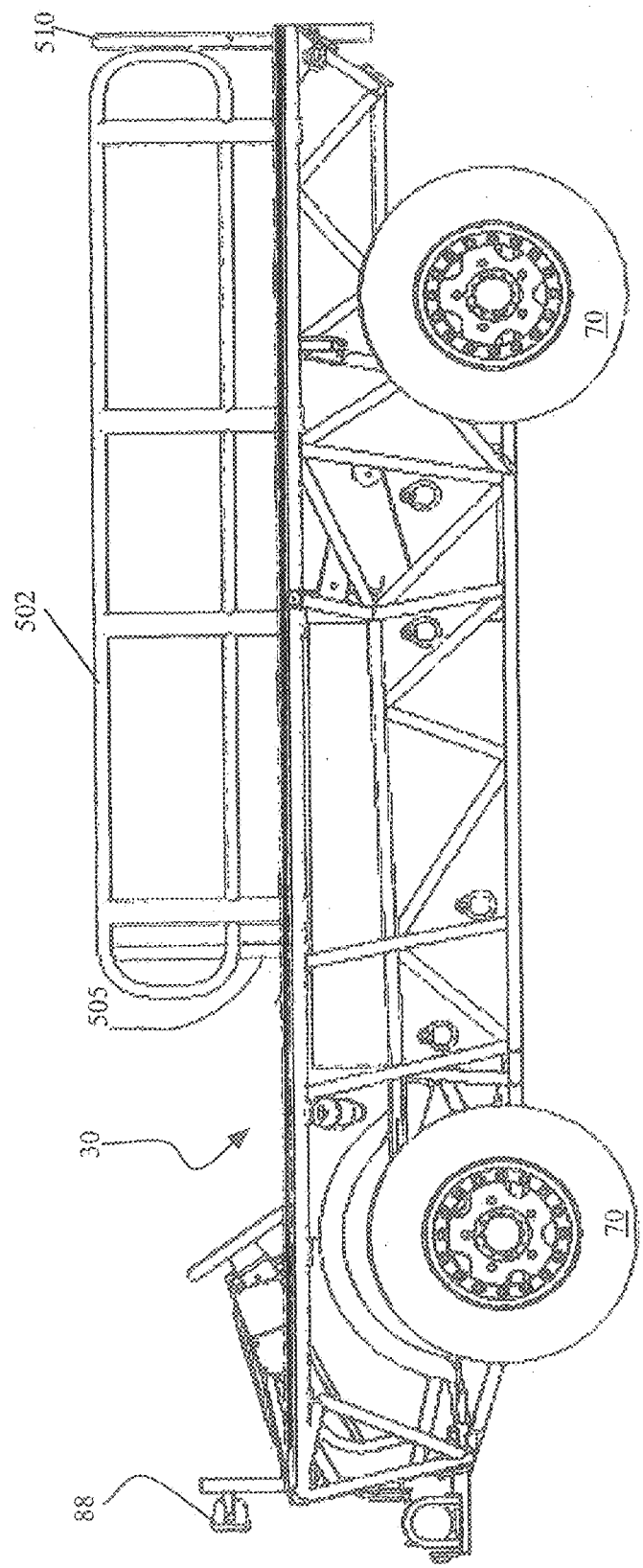
FIGS. 6A and 6B shows a stackable mobile platform with rail.
Figure 6B:
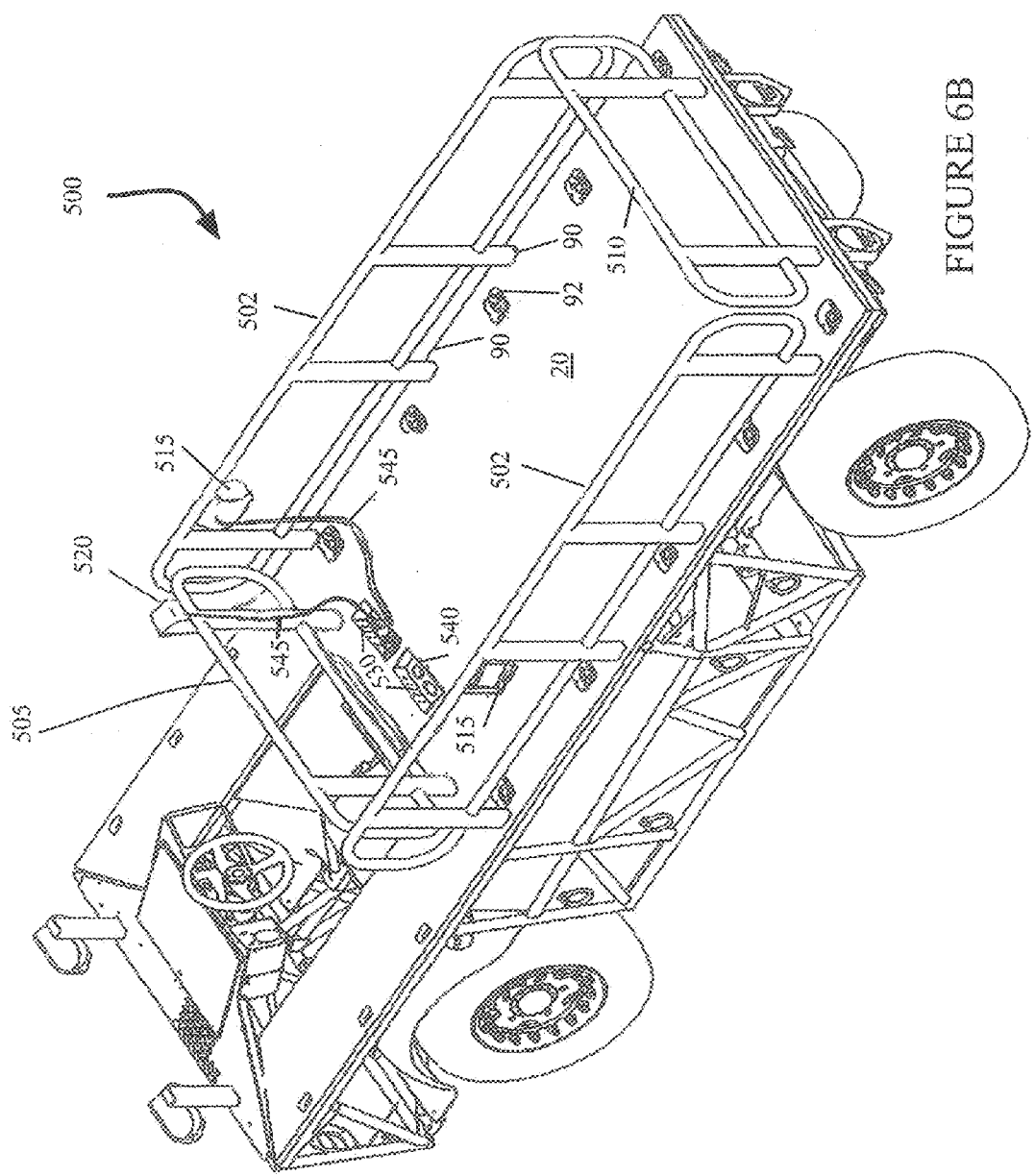

FIGS. 6A and 6B show an implementation wherein rail sides 502, 505 and 510 are removably placed in catches 90. Lighting may be added. Side lights 515 and front light 520 are supported on said rails. One or more power boxes 530 with plug in receptacles 540 are set in the flat lower deck 20 wherein power cords 545 with plug are connected to a power supply (which may be always "on" or switched "on").

Figure 7:
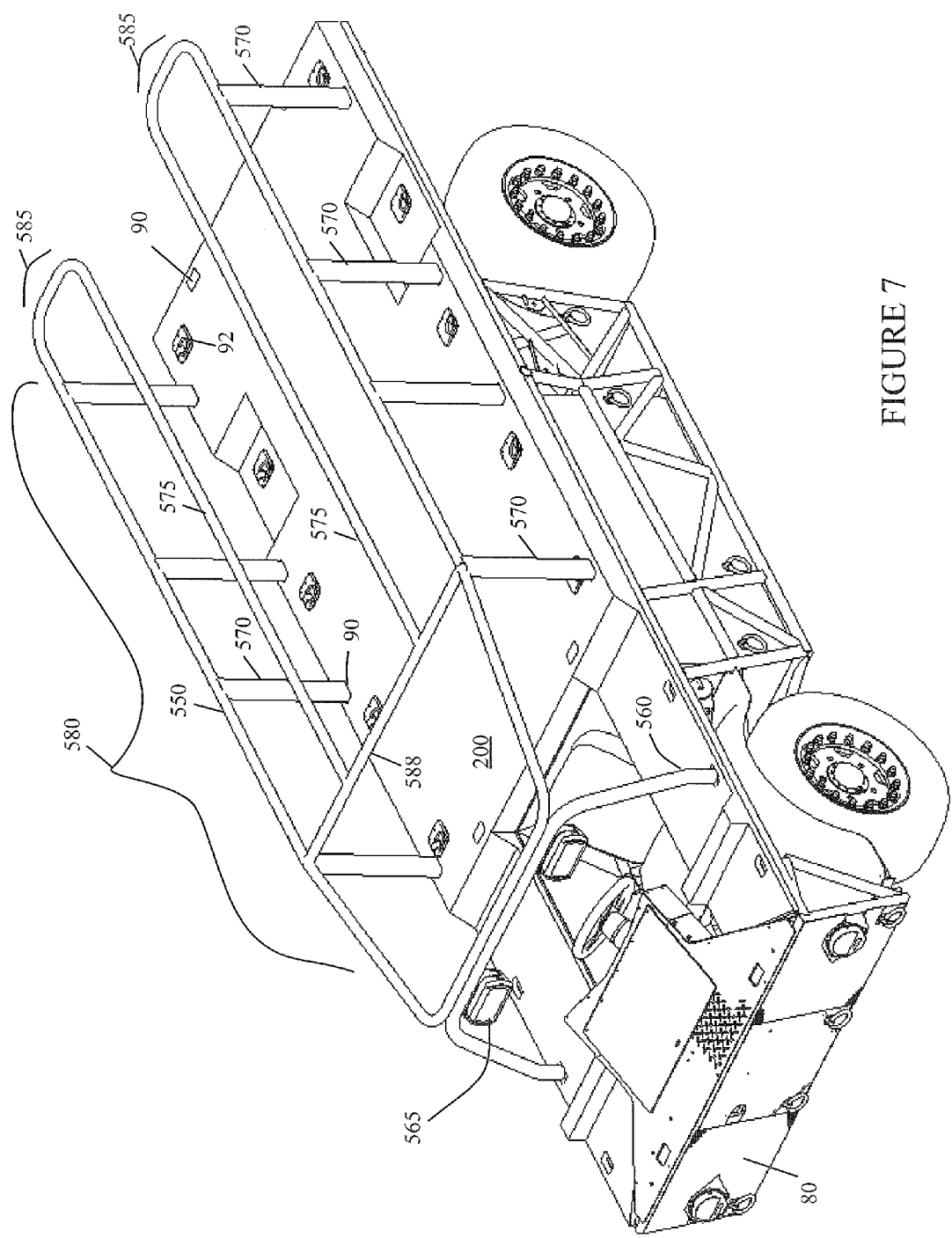
FIG. 7 shows a stackable disaster relief vehicle "DRV" platform with overhang rail.
Figure 8B:
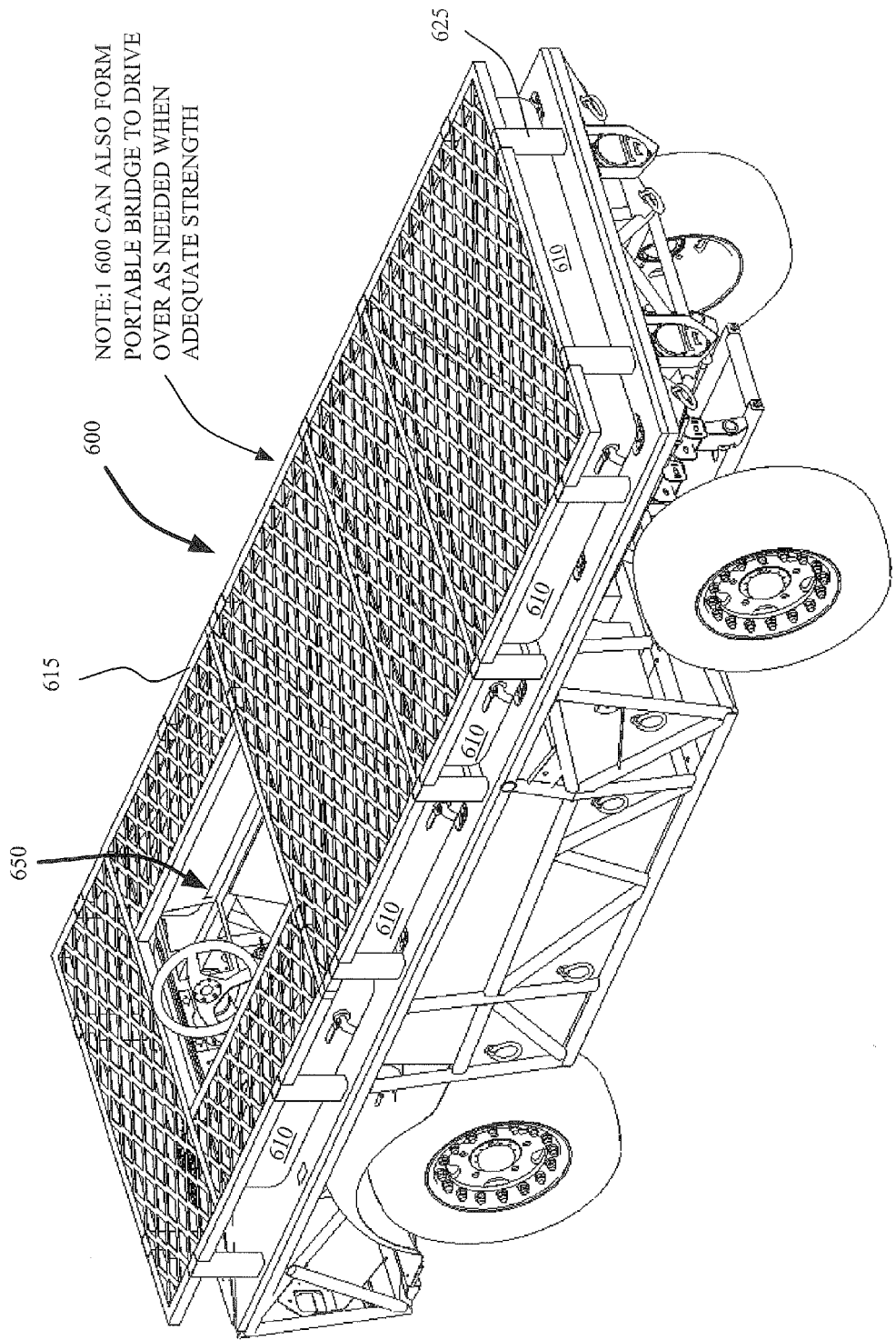
Figure 8C:
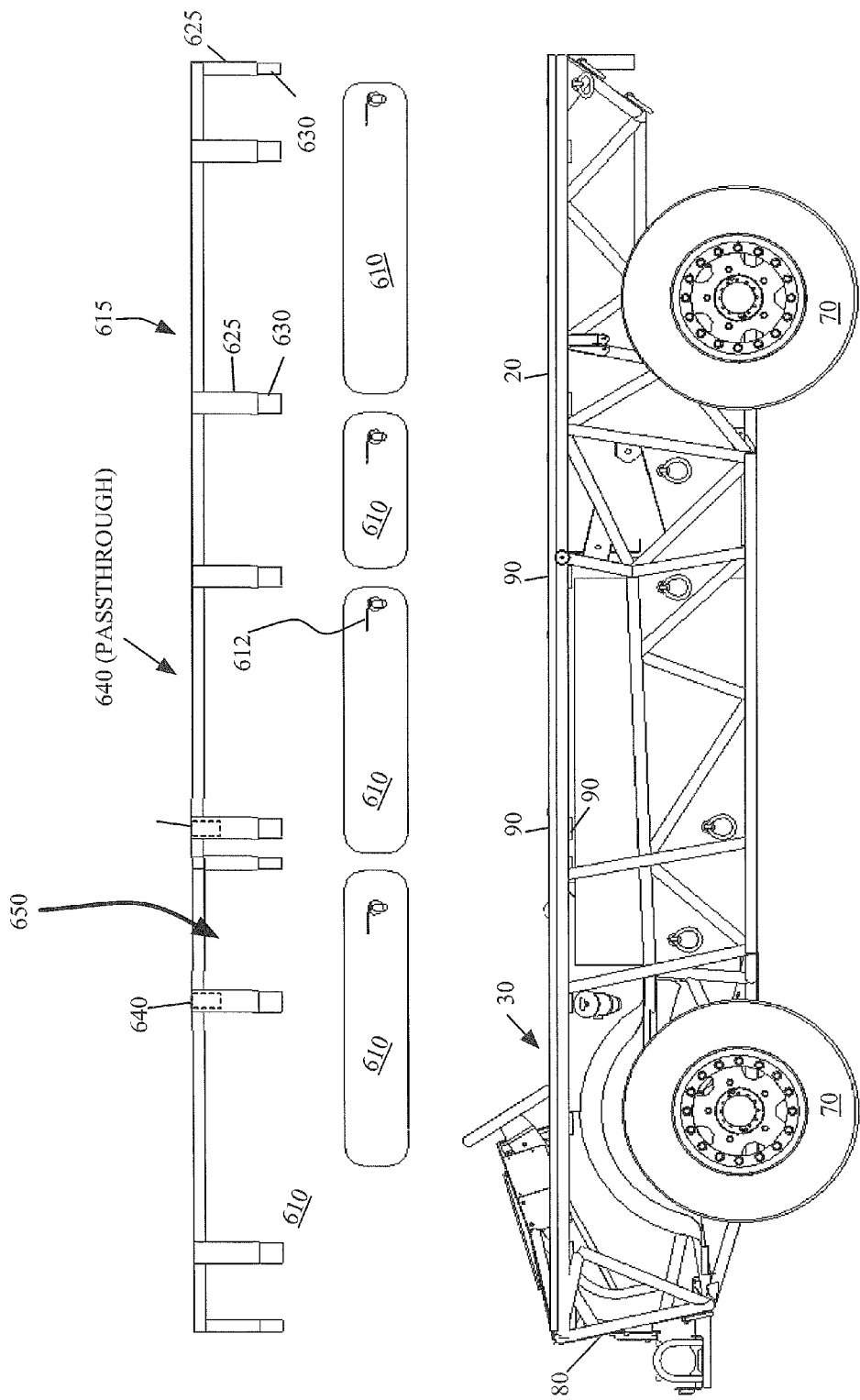
Figure 8D:
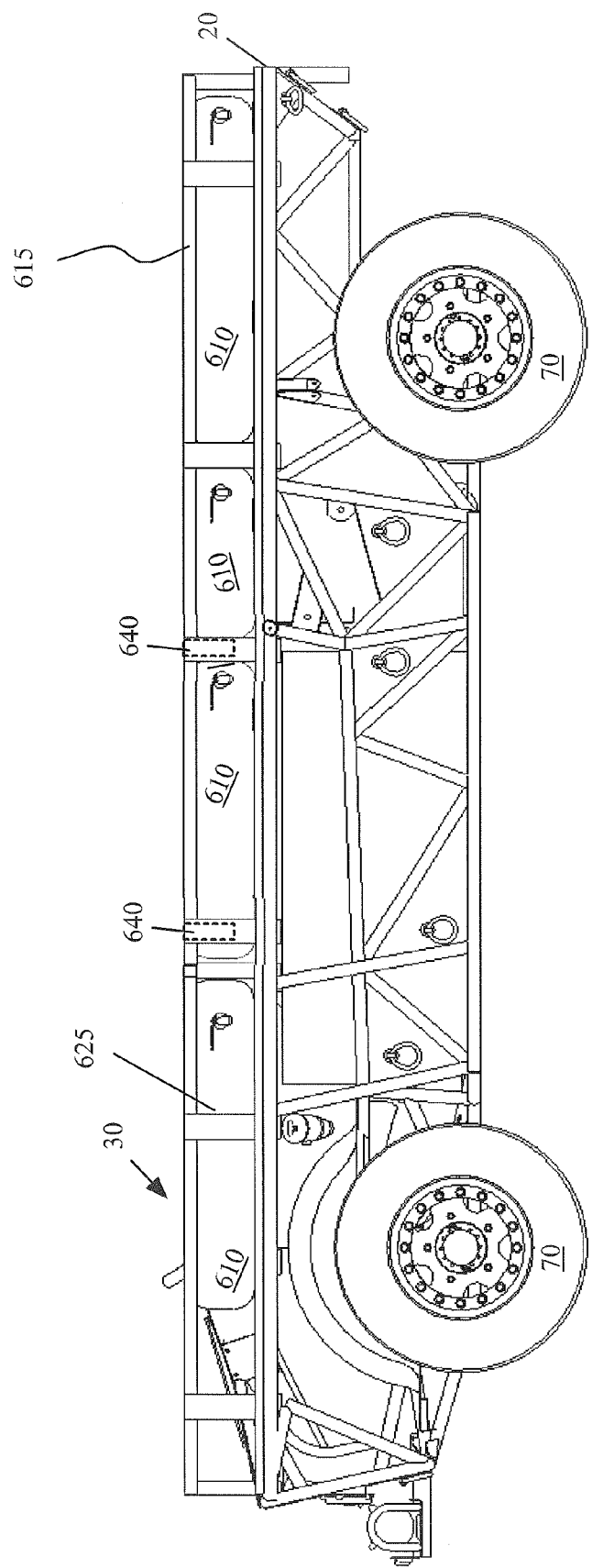

FIG. 7 shows a stackable disaster relief vehicle "DRV" platform with overhang rail 550. A front rail 560 supporting auxiliary front rail lights 565 and the overhang rail are removable. Overhang rail 550 is raised on legs 570 which mate within catches 90 in flat lower deck 200. An upper section 575 of the overhang rail 550 cantilevers from the supported section 580 of the overhang rail 550 and provides a "U" shaped rail shelf 585 comprising supported section 580 and cantilever section 575 attached to upper cross member 588.

FIGS. 8A through 8D show a stackable disaster relief vehicle "DRV" platform with water modules and auxiliary lower support deck. The assembly view shown in FIG. 8C indicates that water modules 610 with valves 612 being placed onto flat lower deck 20. Above the water modules is an auxiliary lower deck 615. The auxiliary lower deck 615 has a deck top 620 shown as a grid mesh (however, depending on usage and weight requirements it may be wood, plastic, metal, tubular, or other materials and shapes). The auxiliary lower deck 615 is supported over the water modules with deck legs 625. Each deck leg has a latching end 630 which fits within the catches 90 formed in the flat lower deck 20 of the DRV. The auxiliary lower deck may also have pass through catches 640 formed therein wherein additional decks, legs, supports, rails and the like may be added. Said pass through catches are shown as being aligned with the deck legs 625. The illustration of the alignment while preferred in this implementation is not a limitation and said pass through catches may be positioned unaligned with said deck legs. Note, auxiliary lower deck when constructed of material to allow for the weight of the DRV may be used as portable bridge for drive over by DRV.

Within the auxiliary lower deck 615 is surround cut-out 650 to allow the driver in the command module 30 to enter and see. Those of ordinary skill in the art will recognize that with respect to rails and the auxiliary lower deck that sizes and heights may vary within the scope of this disclosure. Moreover the auxiliary deck may be a partial deck which does not extend over the complete lower flat deck 20.

Figure 9A:
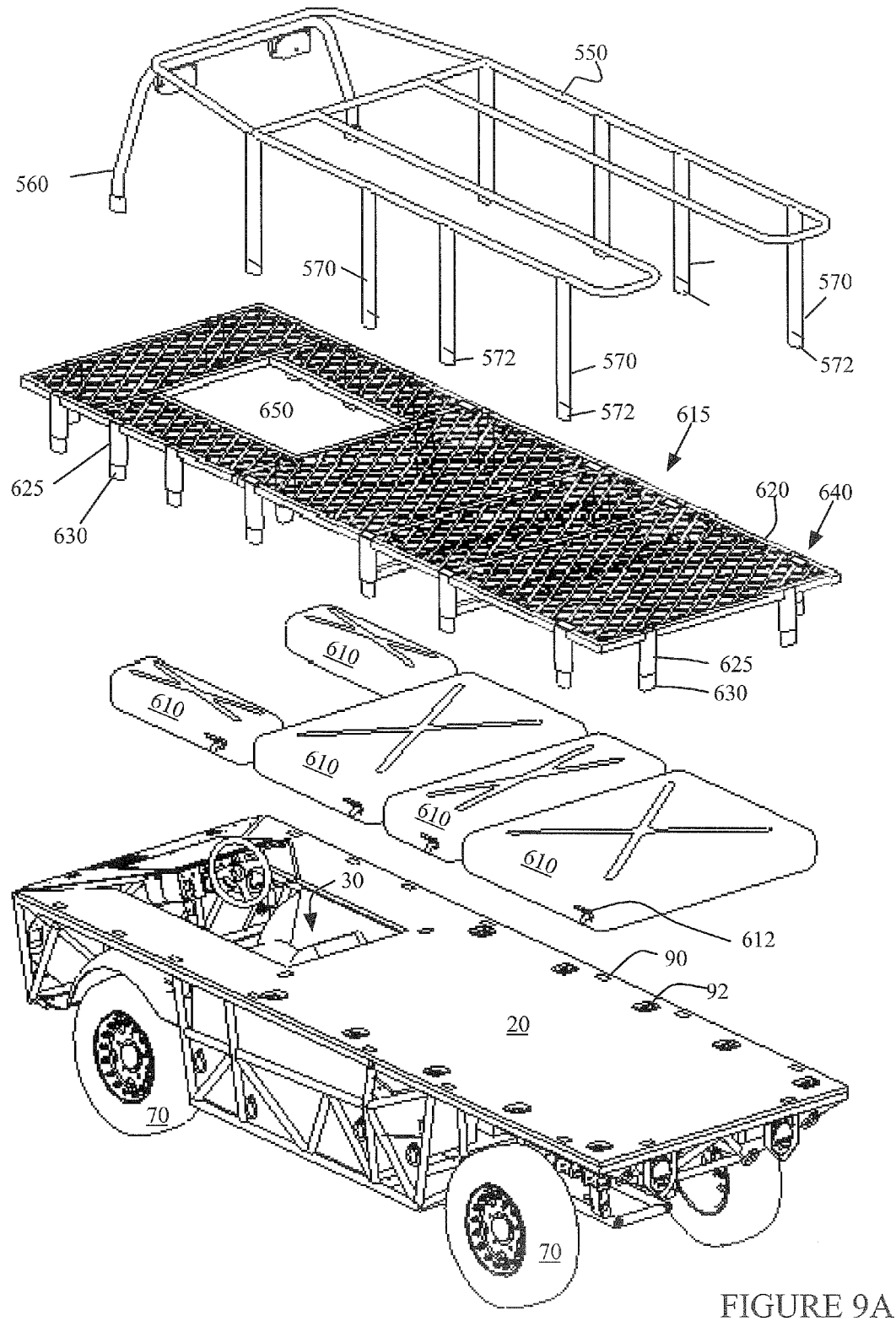
FIGS. 9A through 9C show a stackable mobile platform with water module, auxiliary bed and rails.
Figure 9B:
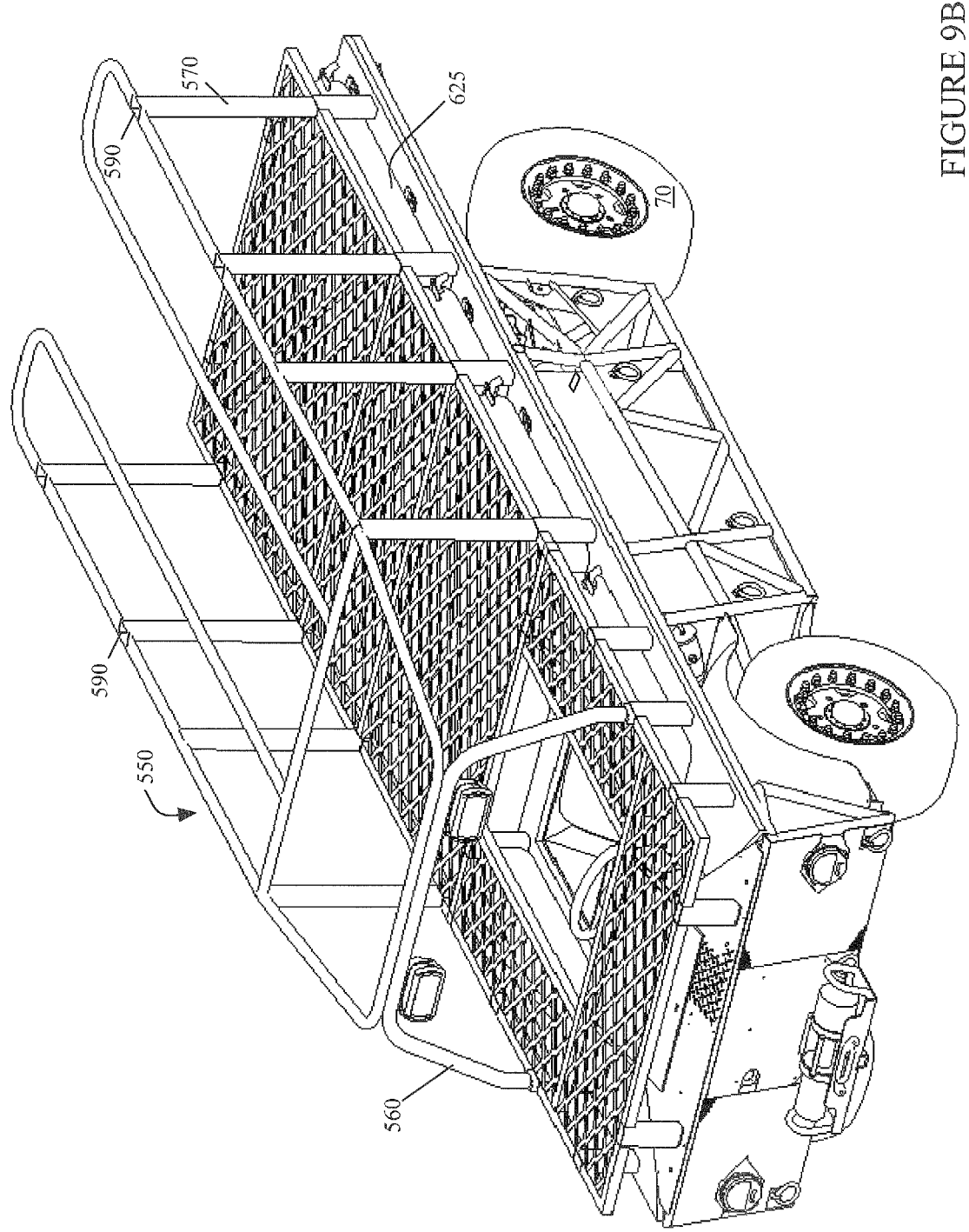
Figure 9C:
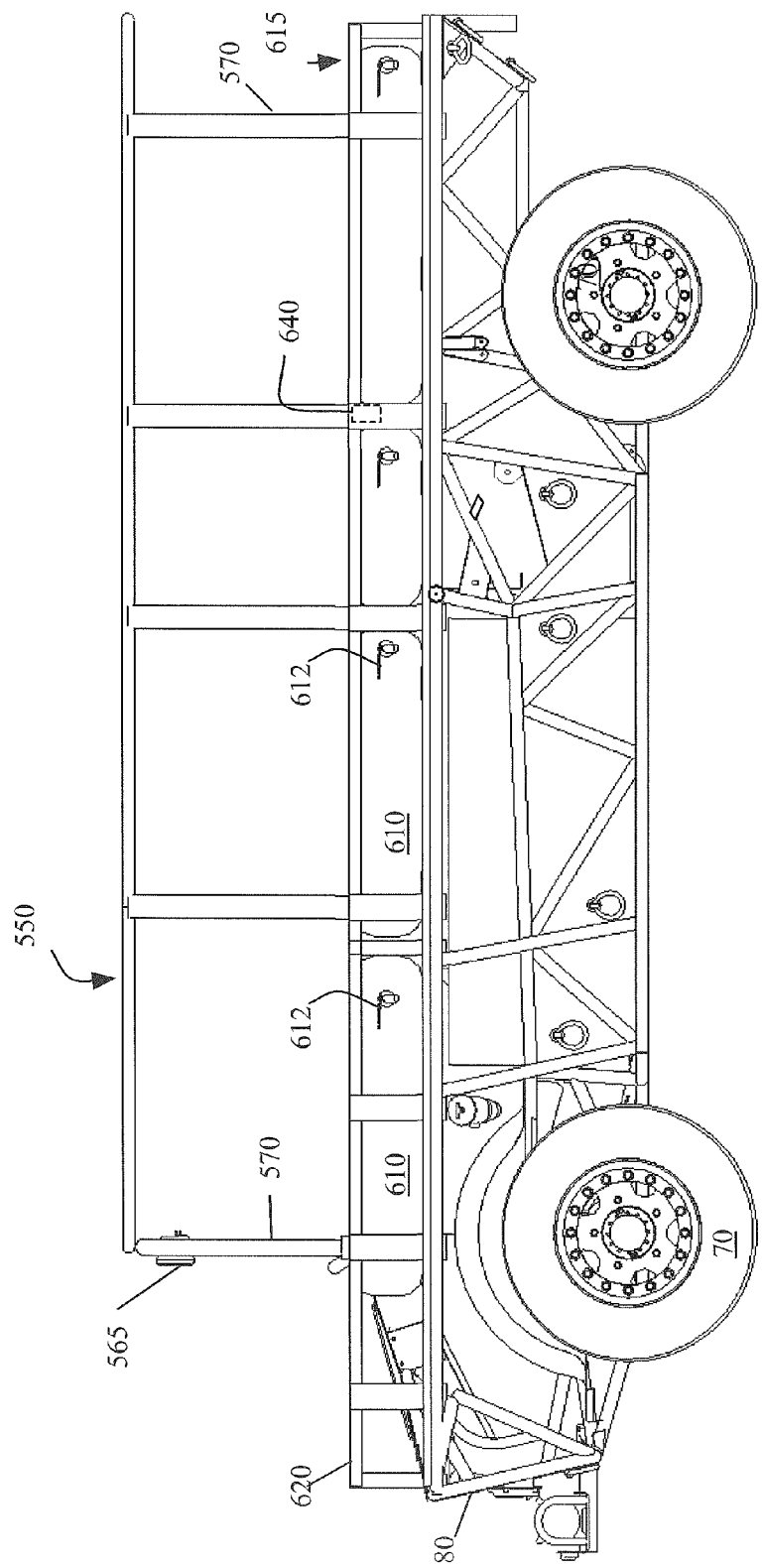

FIGS. 9A through 9C show a stackable disaster relief vehicle "DRV" platform with water modules, auxiliary lower support deck and overhang rail 570. FIG. 9A is an assembly view of the DRV implantation showing aspects of the DRV. The assembly indicates that water modules 610 with valves 612 are placed onto flat lower deck 20. Above the water modules is auxiliary lower deck 615. The auxiliary lower deck 615 is supported over the water modules with deck legs 625. Each deck leg has a latching end 630 which fits within the catches 90 formed in the flat lower deck 20 of the DRV. The auxiliary lower deck also has pass through catches 640 formed therein wherein the legs 570 via latch ends 572 removably mate with the pass through catches 640 in deck legs 625. Additional pass through catches may be provided. In particular rail assemblies including but not limited to the overhang rail 550 shown in FIG. 9B (as well as non-overhang rails) may provide a pass through catch. In FIG. 9B a series of pass through rail catches are indicates as 590.

Figure 10A:
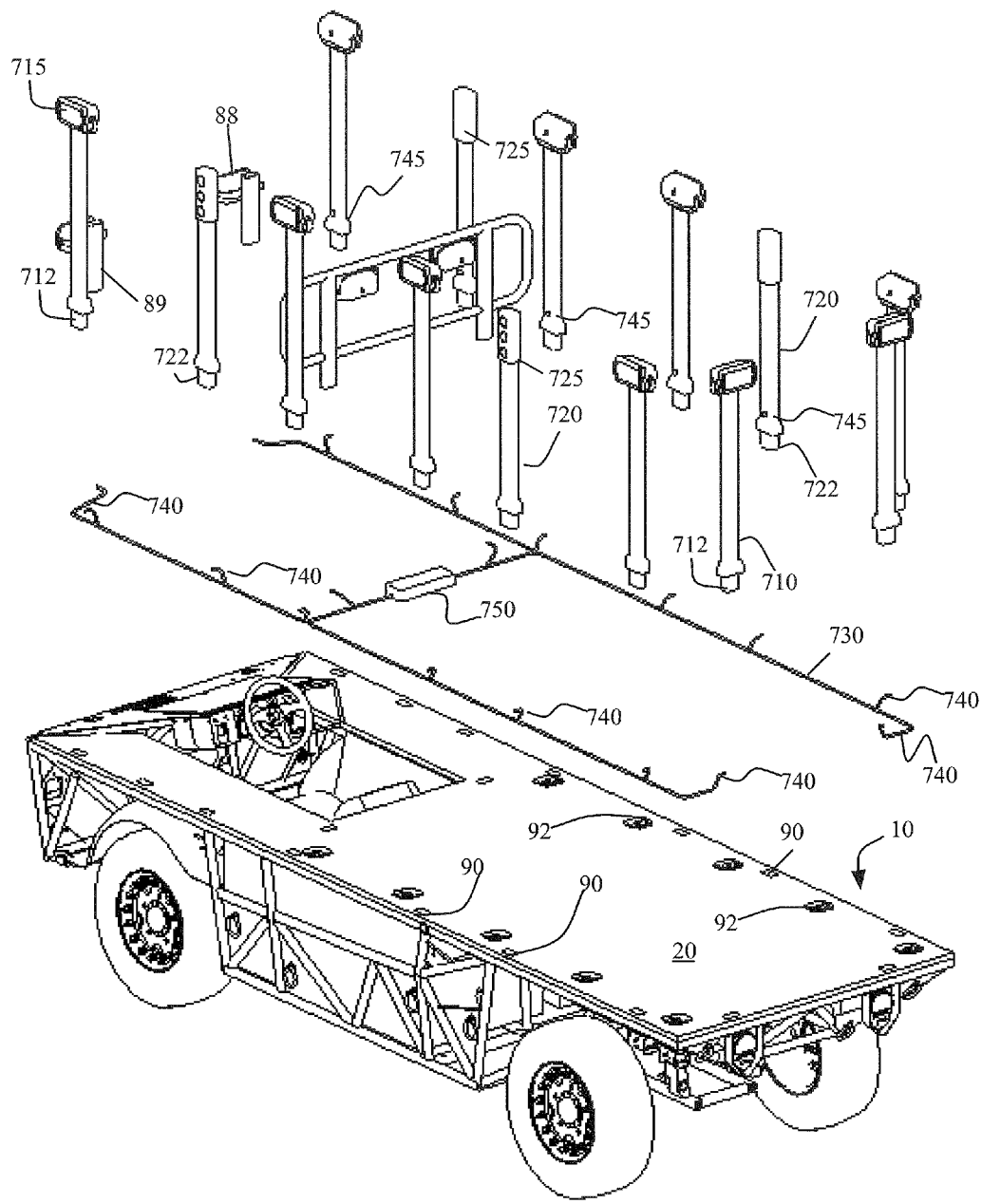
FIGS. 10A through 10C show a stackable vehicle platform with lighting modules.
Figure 10B:
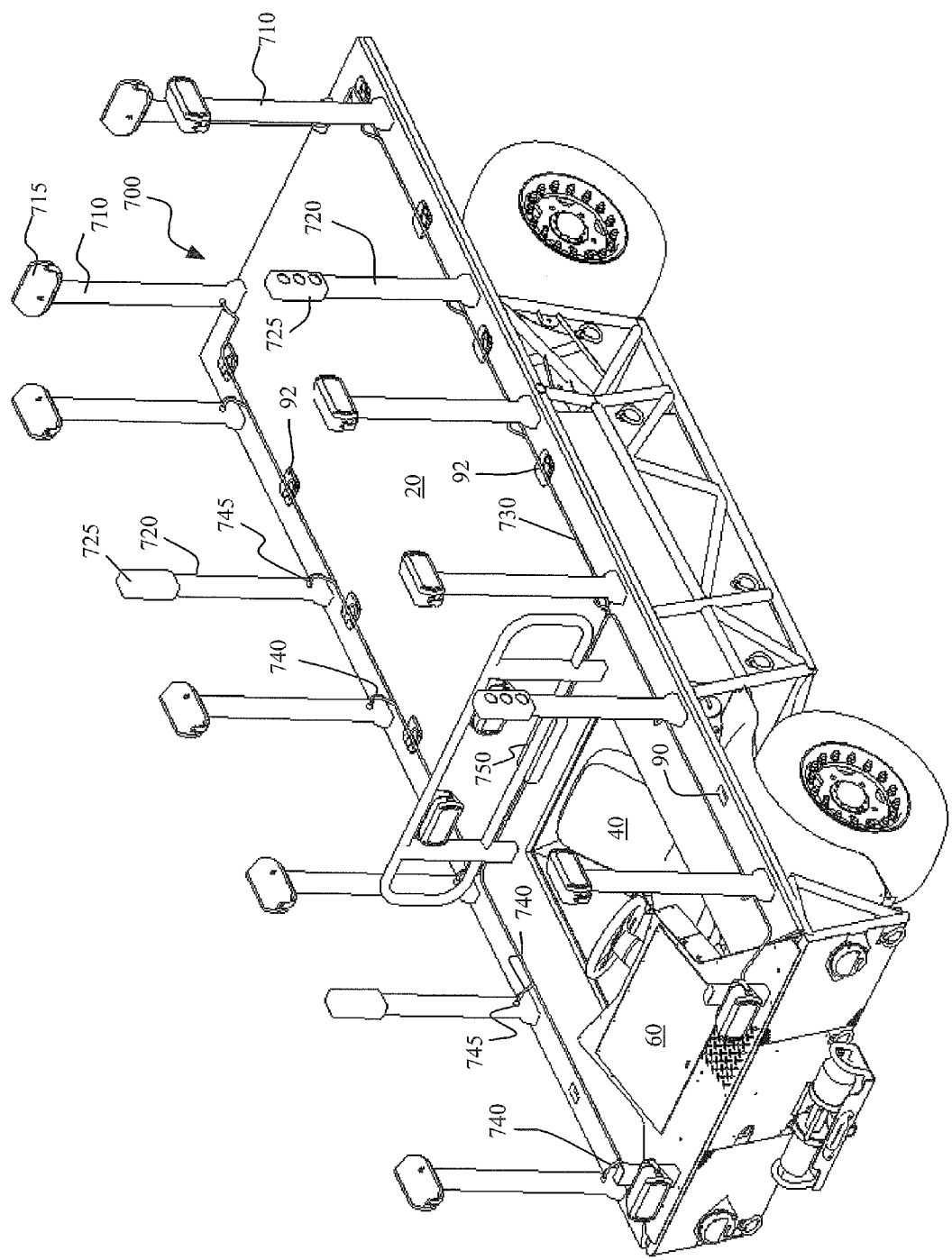
Figure 10C:
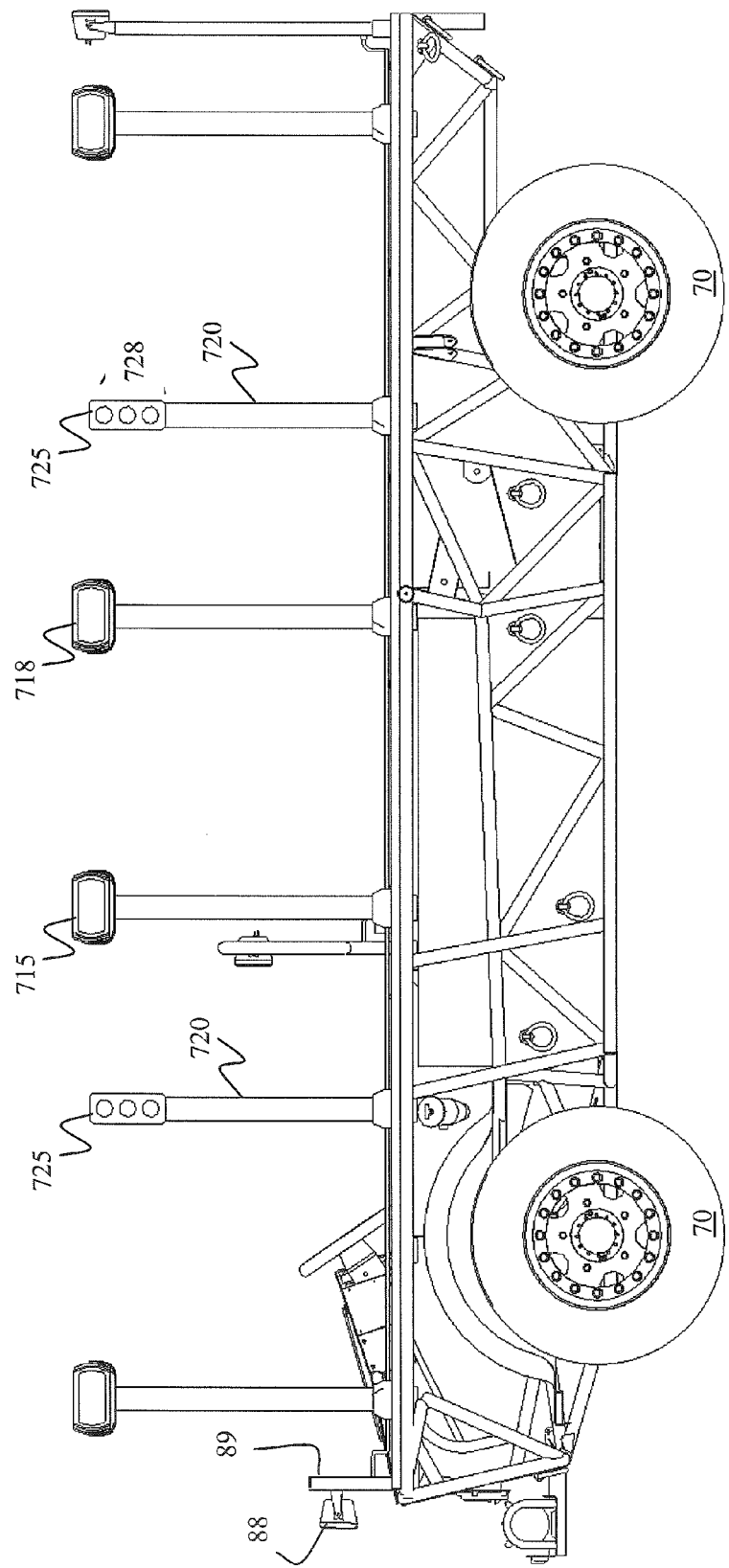

FIGS. 10A through lOC show a stackable mobile platform 700 with lighting modules. A mobile platform such as those shown in FIGS. 1A through 3 are suitable for mobile lighting. However, those of ordinary skill in the art will recognize that specific illustrations of mobile platforms or DRVs are not limiting. Further, illustrations of a mobile platform with lighting support on a lower deck absent an auxiliary lower deck is not a limitation and such lighting could also be supported on an auxiliary lower deck or even from a pass through rail catch (such a pass through rail catch 590 shown in FIG. 9B) as appropriate.

Removable raised lighting posts are shown. Lamp post 710 with a mating latch 712 to mate with catch 90 in the lower deck supports a removable lighting head 715 which connects to contacts (not shown and is wired within also not shown) said lamp post 710. Pole light 720 with mating latch 722 that fits within catch 90 in said flat lower deck 20 illustrates a built in lighting unit 725 containing one or more illumination elements 728. Built in lighting unit 725 is also wired within said post (not shown). However, the wiring on lighting units may be external to the post as appropriate. A wiring harness 730 (as shown) or multiple wiring harnesses (in parallel—not shown) are used to provide electrical power to lighting/illumination. Wiring harness 730 may at least be partially threaded through the recessed tie down catches 92 to generally hold said wiring harness in place.

Each lamp post 710 is shown with power jack 740 and each pole light is supplied with a power jack 745 wherein electrical power is supplied to illumination providing units within lighting heads and lighting units. A junction box which may also be a switching box 750 and which may contain an inverter or other switching components to selectively control and power illuminations is connected to the wiring harness 730.

Illumination is not limited to visible spectrum light. In those instances wherein stealth is required UV or IR (non visible) light may be emitted by lighting elements of the appropriate frequency (including LEDs, lasers and filtered light bulbs). Those of ordinary skill in the art will understand that wavelength specific lighting may also be used to generate topography data to be received by receivers (known in the art) which are located at the mobile platform. The data stream from such receivers can be processed by a computer to generate an image of the surrounding area. Additionally, receivers may also be used to measure noise levels, and to measure heat signatures surrounding the mobile platform.

Figure 11A:
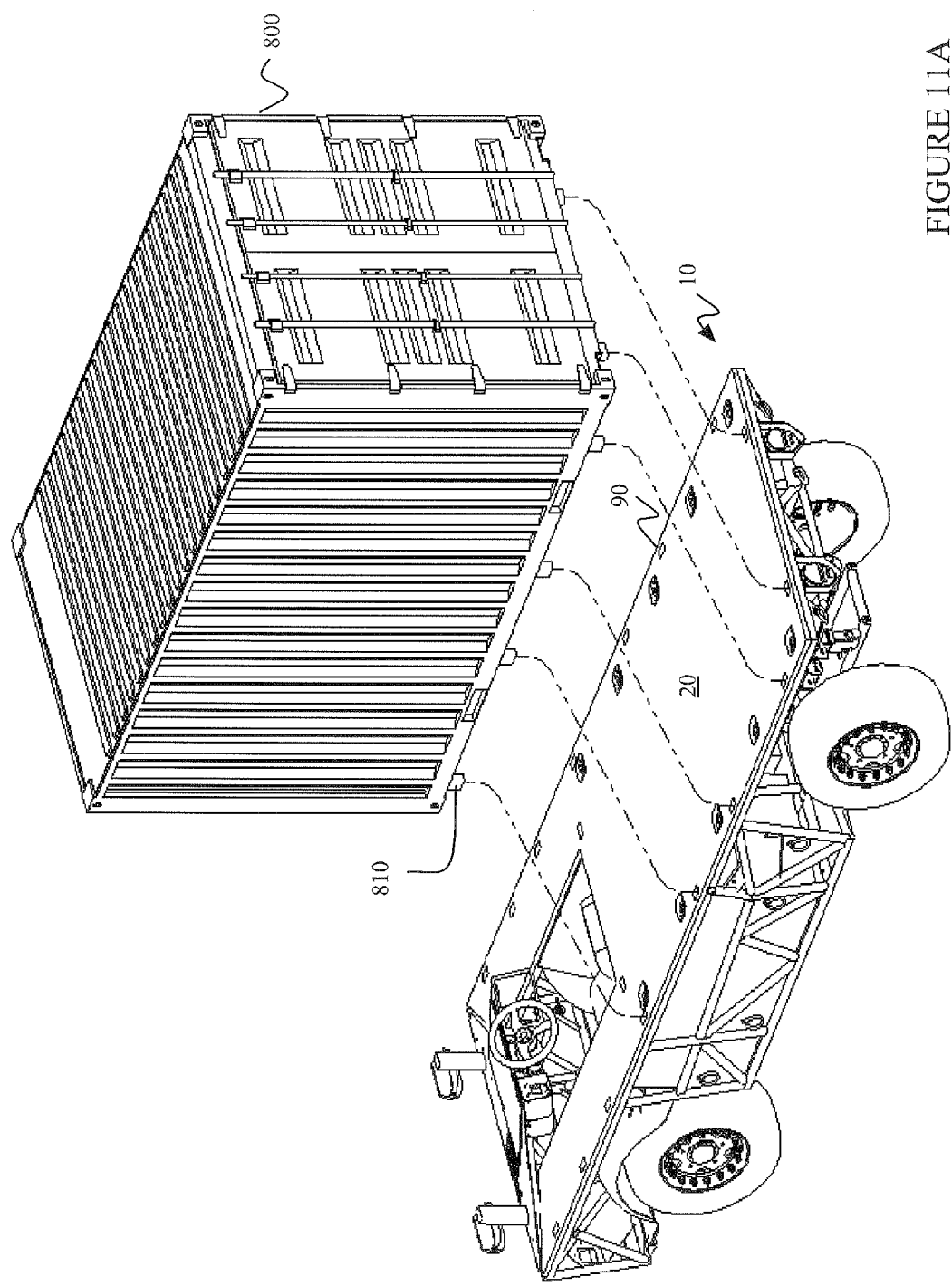
FIGS. 11A through 11C show a stackable deployed vehicle platform with container module.
Figure 11B:
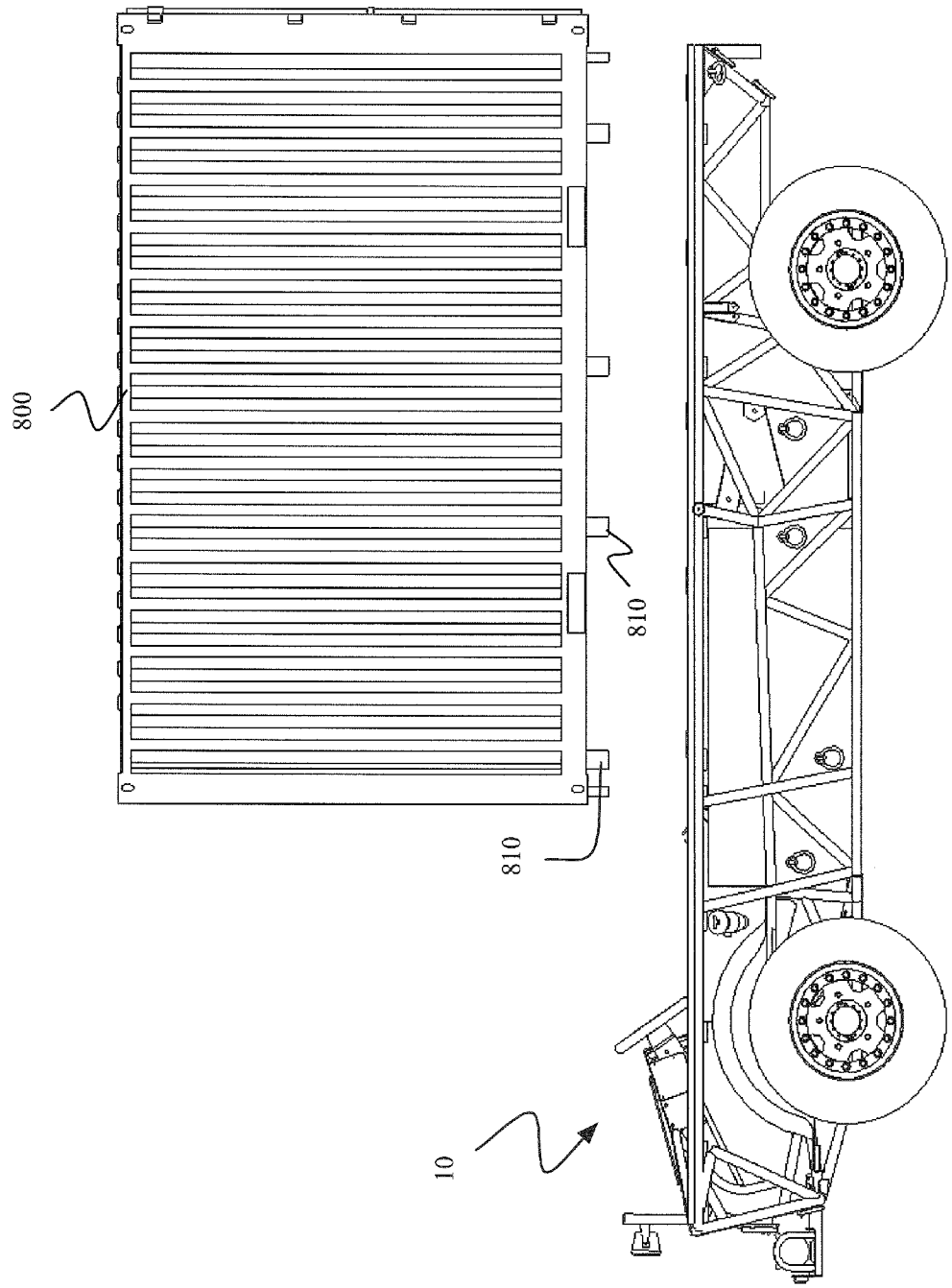
Figure 11C:
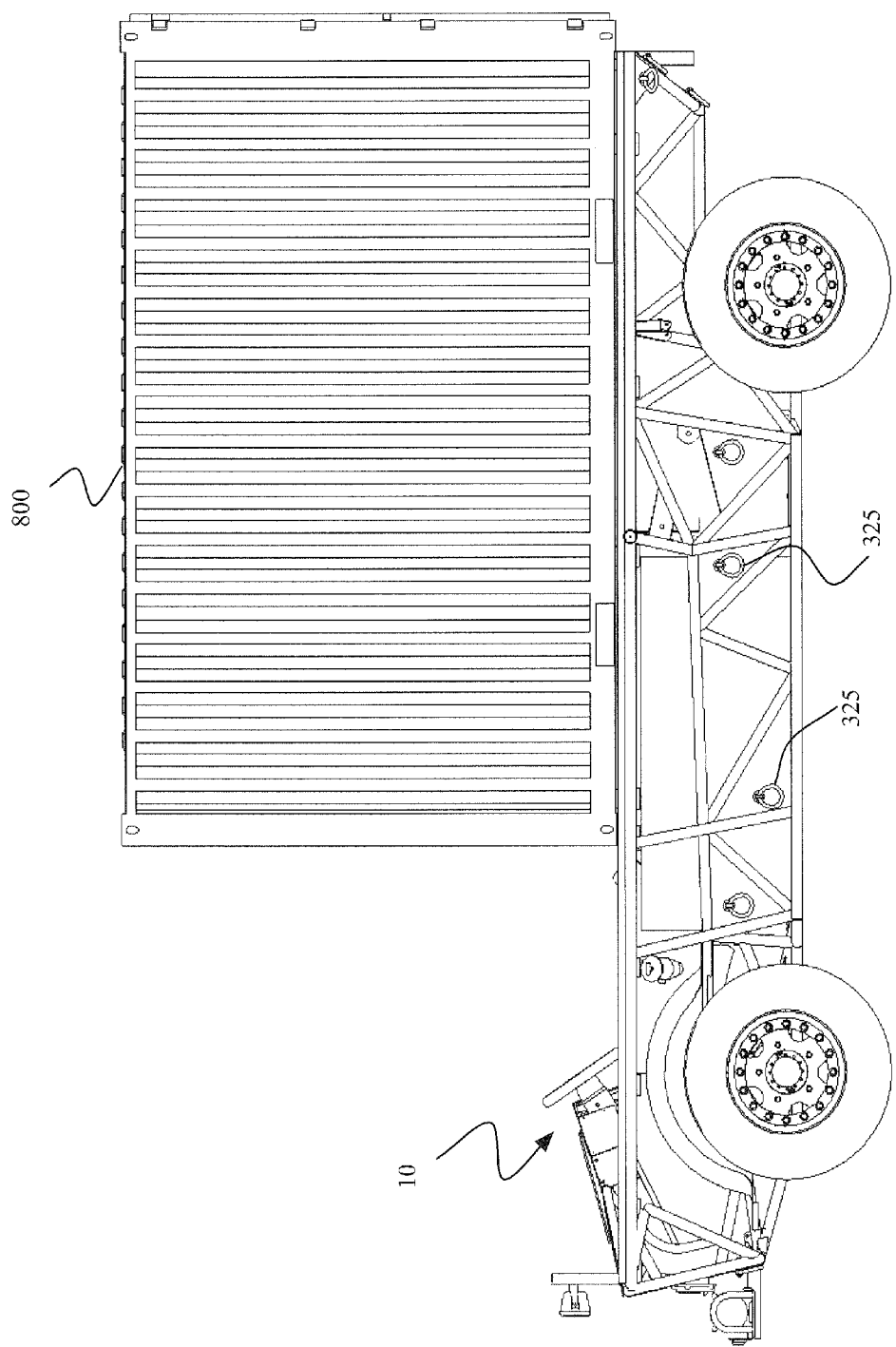

FIGS. 11A through 11C illustrate a DRV platform 10 with removable container module 800. The container module may have container legs 810 which mate with catches 90 to hold the container 800 in place. Said container legs may also be retractable to allow for easier loading of a container on and off said flat lower deck 20 in those instance when said container 800 is unloaded. Ropes, cables or straps may also be used to secure the container via tie down guides 325. The absence of an auxiliary lower deck or water modules is not a limitation.

Figure 12A:
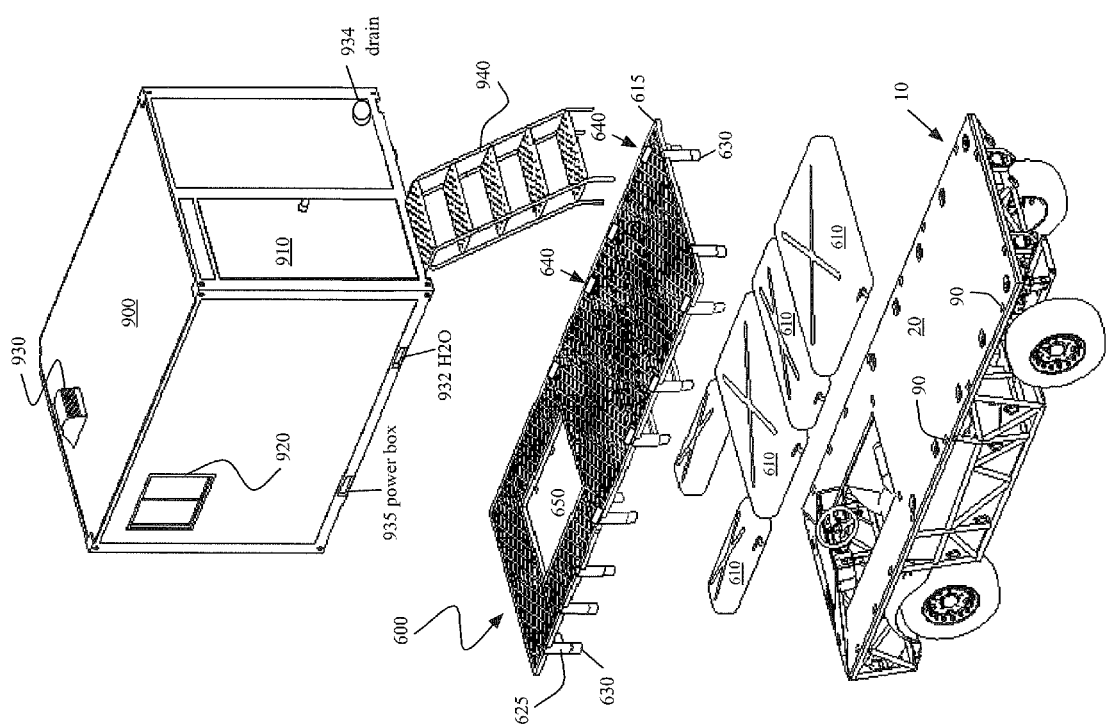
FIGS. 12A through 12D show a deployable stackable vehicle platform with infrastructure module.
Figure 12B:
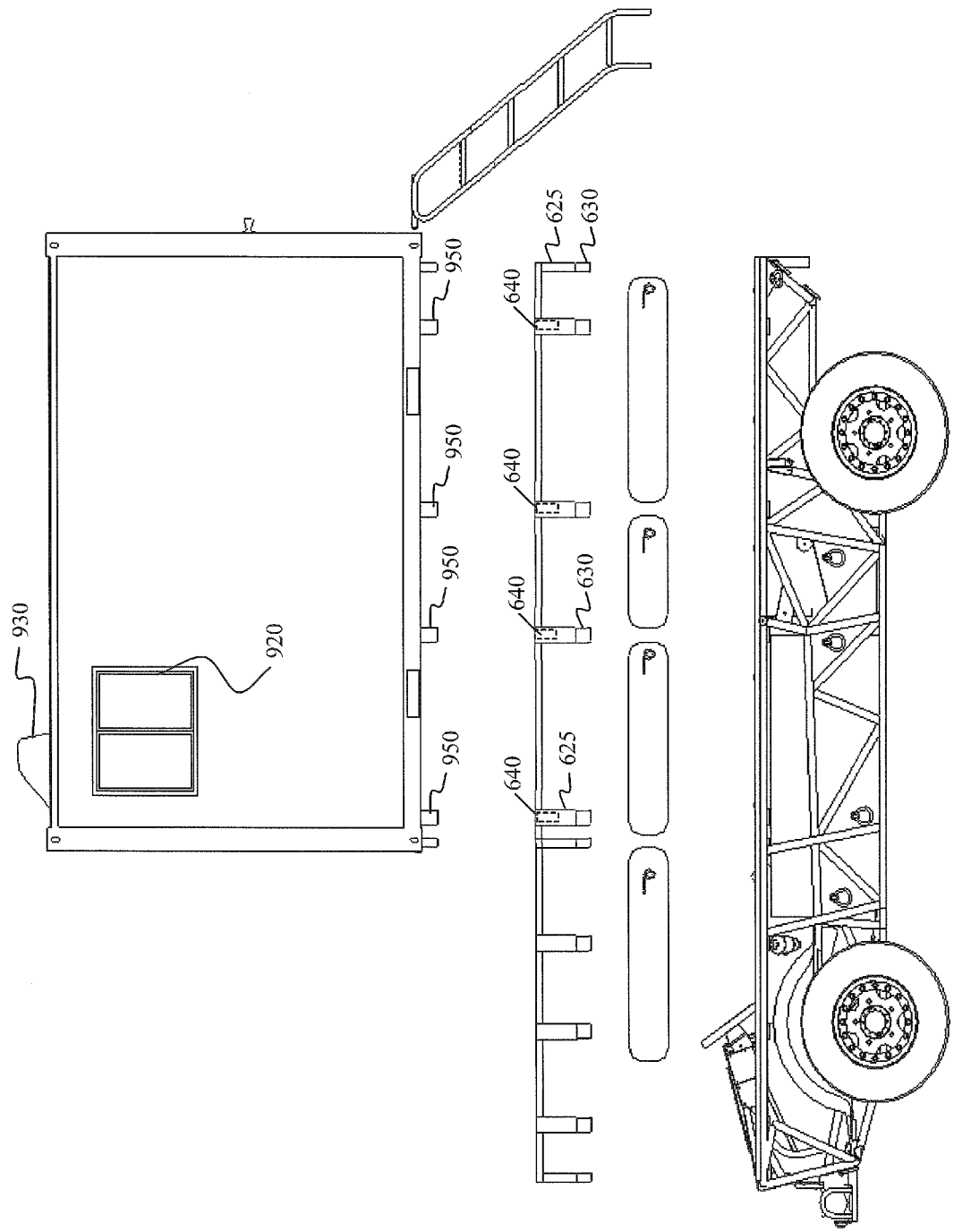
Figure 12C:
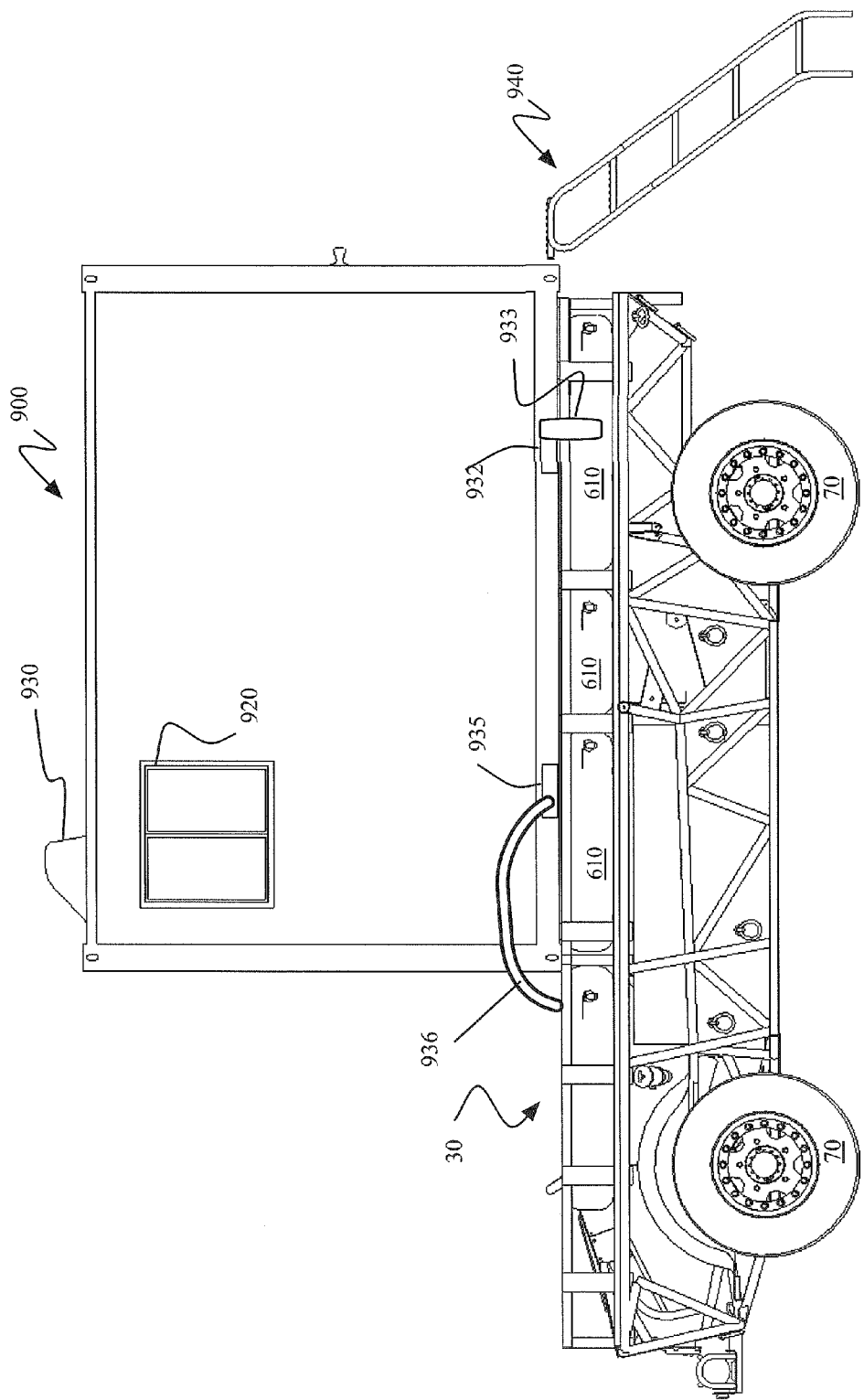
Figure 12D:
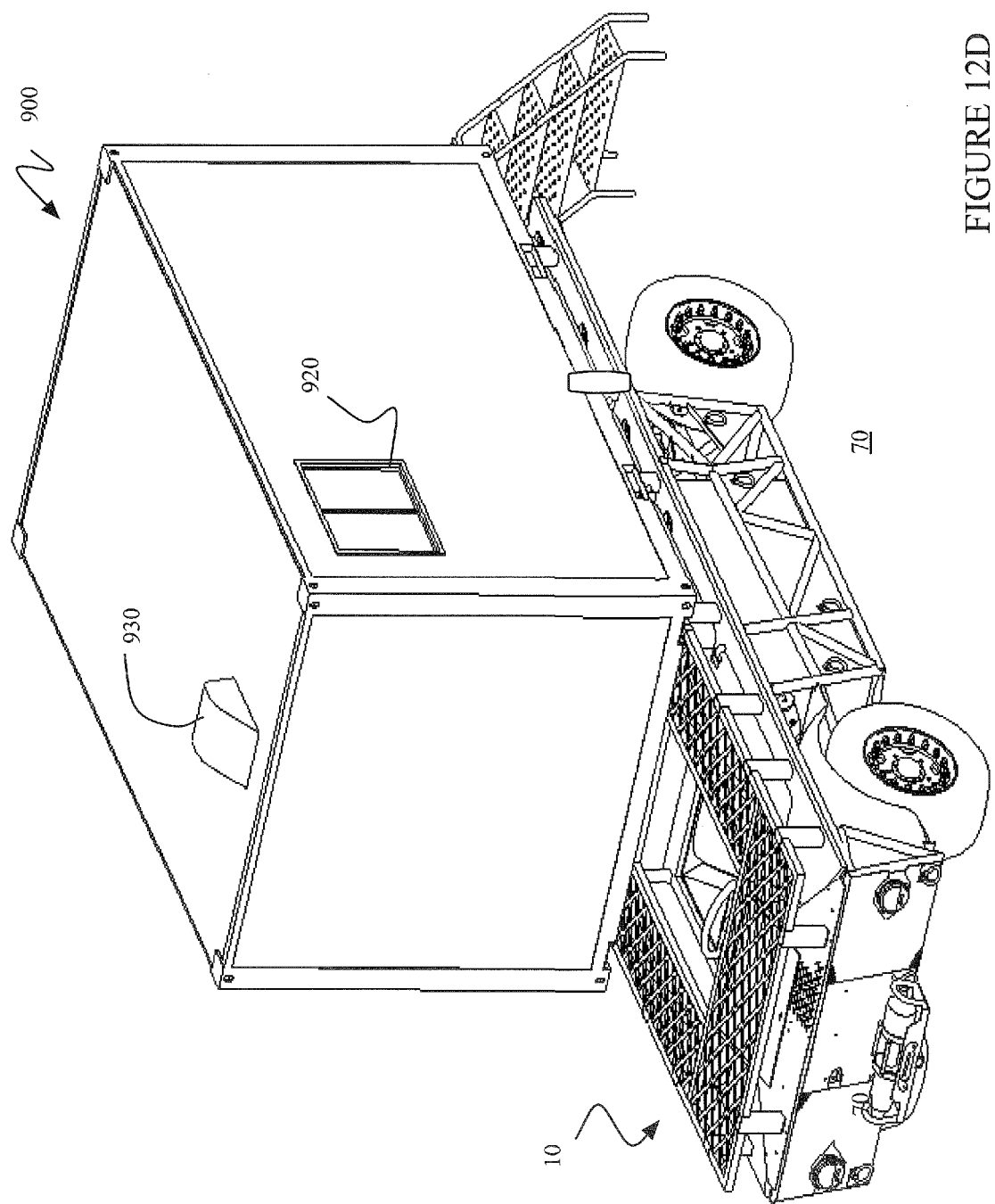

FIGS. 12A through 12D show a deployable stackable vehicle platform with an infrastructure support module "ISM". ISMs include but are not limited to command, medical, pharmacy, communications, office, utility control (water, power, etc.), armory, kitchen, surgical center, medical diagnostic, bio lab and biohazard lab) and water module and auxiliary lower deck 600. FIG. 12A shows an assembly view of a mobile relief, emergency or disaster vehicle with water and ISM. On top of a DRV mobile platform 10 as series of water modules 610 are placed. Above the water modules an auxiliary lower deck 600 with deck legs 625 and pass through catches 640 is located, said auxiliary deck mates over said water modules via latching ends 630 that fit into said pass through catches in flat lower deck 20. ISM 900 is placed on top of auxiliary lower deck 600.

The ISM in this implementation has entry passage 910, optional window 920, vent 930 drain 932 water supply in 932 and drain extending from the interior of the infra structure module. Connections for the water supply 932 are accessible from the outside of the infra structure module. Power connection 935 for receiving power for the infra structure module 900 is shown on the side of the infra structure module 900. The configuration of the ISM shown in FIGS. 12A-D is not a limitation.

A staircase 940 may be attached to a non-moving platform to facilitate entry of the ISM when said module is located on said mobile platform. Module legs 950, which may be retractable, are shown extended form the bottom of the ISM 900 and which mate with pass through catches 640 auxiliary lower deck 600.

When assembled (FIG. 12C) a water connection line 933 to supply water from the water modules 610 may be used in those instance when alternate water supply is not available. Although not shown an electric or mechanical water pump either in the platform DRV or within the ISM is used to draw water. Power to the ISM is received at the power connection 935 box and may be supplied either externally (not shown) or via the mobile platform through a power line 936.

A mobile platform equipped with batteries and/or a generator is capable of producing power for on-demand use by at least said ISM.

While the method and agent have been described in terms of what are presently considered to be the most practical and preferred embodiments, it is to be understood that the disclosure need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes any and all embodiments of the following claims.

It should also be understood that a variety of changes may be made without departing from the essence of the disclosure. Such changes are also implicitly included in the description. They still fall within the scope of this disclosure. It should be understood that this disclosure is intended to yield a patent covering numerous aspects of the invention both independently and as an overall system and in both method and apparatus modes.

Further, each of the various elements of the disclosure and claims may also be achieved in a variety of manners. This disclosure should be understood to encompass each such variation, be it a variation of an implementation of any apparatus implementations, a method or process implementations, or even merely a variation of any element of these.

Particularly, it should be understood that as the disclosure relates to elements of the invention, the words for each element may be expressed by equivalent apparatus terms or method terms—even if only the function or result is the same.

Such equivalent, broader, or even more generic terms should be considered to be encompassed in the description of each element or action. Such terms can be substituted where desired to make explicit the implicitly broad coverage to which this invention is entitled.

It should be understood that all actions may be expressed as a means for taking that action or as an element which causes that action.

Similarly, each physical element disclosed should be understood to encompass a disclosure of the action which that physical element facilitates.

Any patents, publications, or other references mentioned in this application for patent are hereby incorporated by reference. In addition, as to each term used it should be understood that unless its utilization in this application is inconsistent with such interpretation, common dictionary definitions should be understood as incorporated for each term and all definitions, alternative terms, and synonyms such as contained in at least one of a standard technical dictionary recognized by artisans and the Random House Webster's Unabridged Dictionary, latest edition are hereby incorporated by reference.

Finally, all referenced listed in the Information Disclosure Statement or other information statement filed with the application are hereby appended and hereby incorporated by reference; however, as to each of the above, to the extent that such information or statements incorporated by reference might be considered inconsistent with the patenting of this/these invention(s), such statements are expressly not to be considered as made by the applicant(s).

In this regard it should be understood that for practical reasons and so as to avoid adding potentially hundreds of claims, the applicant has presented claims with initial dependencies only.

Support should be understood to exist to the degree required under new matter laws—including but not limited to United States Patent Law 35 USC 132 or other such laws—to permit the addition of any of the various dependencies or other elements presented under one independent claim or concept as dependencies or elements under any other independent claim or concept.

To the extent that insubstantial substitutes are made, to the extent that the applicant did not in fact draft any claim so as to literally encompass any particular exemplary implementations, and to the extent otherwise applicable, the applicant should not be understood to have in any way intended to or actually relinquished such coverage as the applicant simply may not have been able to anticipate all eventualities; one skilled in the art, should not be reasonably expected to have drafted a claim that would have literally encompassed such alternative exemplary implementations.

Further, the use of the transitional phrase "comprising" is used to maintain the "open-end" claims herein, according to traditional claim interpretation. Thus, unless the context requires otherwise, it should be understood that the term "compromise" or variations such as "comprises" or "comprising", are intended to imply the inclusion of a stated element or step or group of elements or steps but not the exclusion of any other element or step or group of elements or steps.

Such terms should be interpreted in their most expansive forms so as to afford the applicant the broadest coverage legally permissible.

The invention claimed is:

1. A first stackable mobile platform vehicle comprising:
    a body frame with attached tires and wheels with total load bearing strength of at least 4000 pounds;
    at least a transaxles with tires and wheels attached to said body frame;
    at least one electrical generator;
    at least one electrical motor;
    at least one transaxle coupled to the at least one electrical motor;
    an internal combustion engine in said body frame coupled to said electrical generator whereby electricity may be generated;
    a flat lower deck on top of said body frame with a total load bearing strength of at least 4000 pounds;
    at least one additional stackable mobile platform vehicle on top of said flat lower deck;
    one or more water containers on top of said flat lower deck; and
    an auxiliary lower deck removably placed above said water containers and supported on legs which mate with catches in said flat corner deck whereby said one or more water containers are protected and said auxiliary deck provides load bearing capacity.

2. The first stackable platform vehicle of claim 1, further comprising electricity generated by said generator for output from at least one of said stackable vehicle.

3. A stackable mobile platform vehicle comprising:
    a body frame with attached tires and wheels;
    at least a transaxles with tires and wheels attached to said body frame;
    at least one electrical generator;
    at least one electrical motor;
    at least one transaxle coupled to the at least one electrical motor;
    an internal combustion engine in said body frame coupled to said electrical generator whereby electricity may be generated;
    a flat lower deck on top of said body frame;
    one or more water containers on top of said flat lower deck; and,
    an auxiliary lower deck removably placed above said water containers and supported on legs which mate with catches in said flat corner deck whereby said one or more water containers are protected and said auxiliary deck provides load bearing capacity.

4. The stackable mobile platform vehicle of claim 3 further comprising an overhang rail attached to said lower deck.

5. The stackable mobile platform vehicle of claim 3 further comprising:
    pole lights attached to said lower deck; and,
    electricity to power the lights in said pole lights supplied by said mobile platform.

6. The stackable mobile platform vehicle of claim 3 further comprising a removable infrastructure support module attached to said lower deck; and,
    electricity and water for the removable infrastructure support module by said mobile platform.

* * * * *